(12) United States Patent
Okabe et al.

(10) Patent No.: US 10,345,870 B2
(45) Date of Patent: Jul. 9, 2019

(54) ELECTRONIC APPARATUS, CONTROL DEVICE, AND OPERATING METHOD OF ELECTRONIC APPARATUS

(71) Applicant: KYOCERA CORPORATION, Kyoto (JP)

(72) Inventors: Ryosuke Okabe, Yokohama (JP); Kayoko Yoshihara, Neyagawa (JP); Eiko Kameoka, Yokohama (JP); Hidetoshi Hachiya, Yokohama (JP); Tomoe Meura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/039,125

(22) Filed: Jul. 18, 2018

(65) Prior Publication Data
US 2018/0321713 A1    Nov. 8, 2018

Related U.S. Application Data

(63) Continuation of application No. PCT/JP2017/000972, filed on Jan. 13, 2017.

(51) Int. Cl.
| | | |
|---|---|---|
| G06F 1/16 | (2006.01) | |
| G06K 7/08 | (2006.01) | |
| G06K 7/10 | (2006.01) | |
| H01Q 1/22 | (2006.01) | |
| G01S 19/13 | (2010.01) | |
| G06Q 30/02 | (2012.01) | |
| G06K 19/077 | (2006.01) | |

(52) U.S. Cl.
CPC ............ *G06F 1/1698* (2013.01); *G01S 19/13* (2013.01); *G06K 7/082* (2013.01); *G06K 7/089* (2013.01); *G06K 7/10* (2013.01); *G06K 19/077* (2013.01); *G06Q 30/0269* (2013.01); *H01Q 1/2266* (2013.01)

(58) Field of Classification Search
None
See application file for complete search history.

(56) References Cited

FOREIGN PATENT DOCUMENTS

| | | |
|---|---|---|
| JP | 10-285153 | 10/1998 |
| JP | 2002-318788 A | 10/2002 |
| JP | 2011-043953 A | 3/2011 |

*Primary Examiner* — Kristy A Haupt
(74) *Attorney, Agent, or Firm* — Duane Morris LLP

(57) ABSTRACT

An electronic apparatus includes a communication unit and at least one processor. The communication unit communicates with an IC chip of a communication device to obtain information in the IC chip. The at least one processor performs processing based on obtained information being obtained by the communication unit. The at least one processor discards the obtained information if the communication unit becomes unable to communicate with the IC chip.

18 Claims, 23 Drawing Sheets

F I G . 4
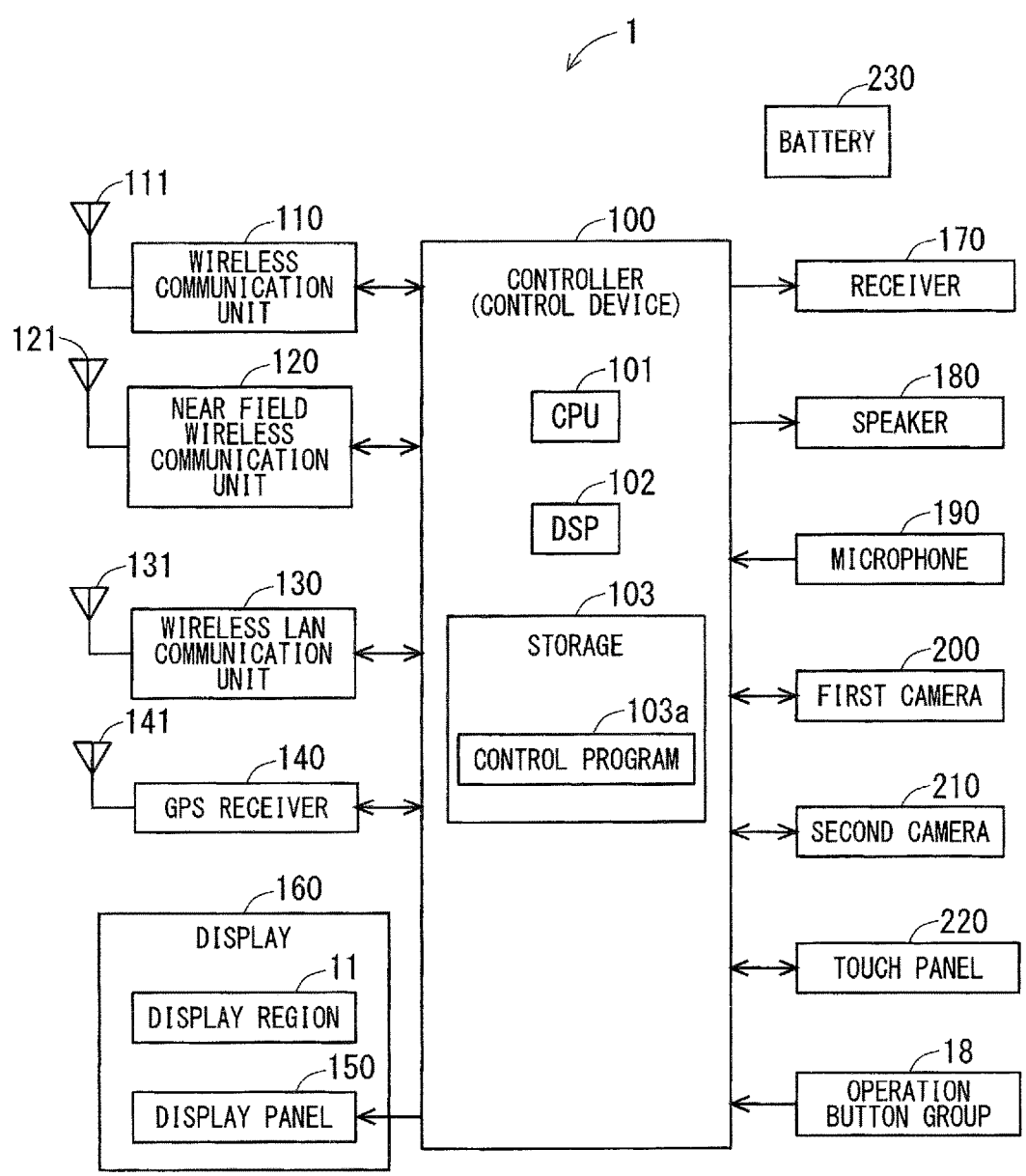

F I G. 3 7
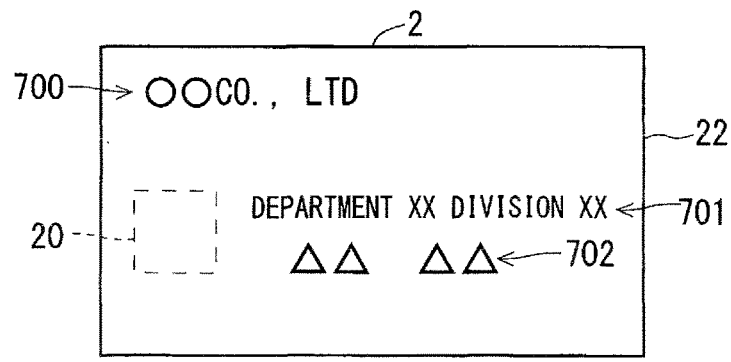
F I G. 3 8
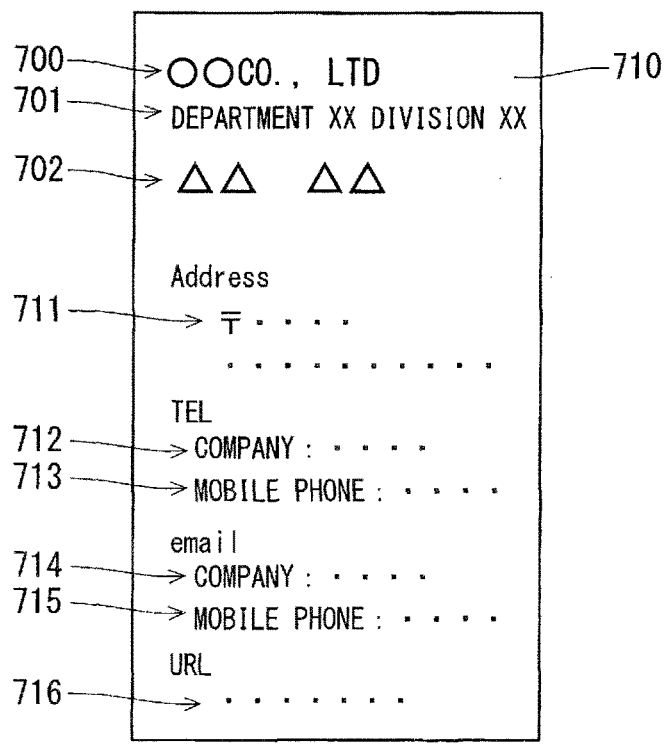

ELECTRONIC APPARATUS, CONTROL DEVICE, AND OPERATING METHOD OF ELECTRONIC APPARATUS

CROSS-REFERENCE TO RELATED APPLICATION

The present application is a continuation based on PCT Application No. PCT/JP2017/000972 filed on Jan. 13, 2017, which claims the benefit of Japanese Application No. 2016-011766, filed on Jan. 25, 2016. PCT Application No. PCT/JP2017/000972 is entitled "ELECTRONIC APPARATUS, CONTROL DEVICE, AND ELECTRONIC APPARATUS OPERATING METHOD", and Japanese Application No. 2016-011766 is entitled "ELECTRONIC APPARATUS, CONTROL DEVICE, CONTROL PROGRAM, AND OPERATING METHOD OF ELECTRONIC APPARATUS". The contents of which are incorporated by reference herein in their entirety.

FIELD

Embodiments of the present disclosure relate to an electronic apparatus.

BACKGROUND

Various techniques relating to electronic apparatus are proposed.

SUMMARY

An electronic apparatus, control device, and electronic apparatus operating method are disclosed. In one embodiment, an electronic apparatus comprises a communication unit and at least one processor. The communication unit communicates with an IC chip to obtain information in the IC chip. The at least one processor performs processing based on obtained information being obtained by the communication unit. The at least one processor discards the obtained information when the communication unit becomes unable to communicate with the IC chip.

In one embodiment, a control device is included in an electronic apparatus communicating with an IC chip and controls an operation of the electronic apparatus. The control device performs processing based on obtained information being obtained from the IC chip by the electronic apparatus. The control device discards the obtained information when the electronic apparatus becomes unable to communicate with the IC chip.

In one embodiment, an operating method of an electronic apparatus comprises: (a) communicating with an IC chip to obtain information in the IC chip; (b) performing processing based on obtained information being obtained in the (a); and (c) discarding the obtained information when a communication with the IC chip becomes unable to be performed.

BRIEF DESCRIPTION OF THE DRAWINGS

FIG. 4 illustrates a block diagram showing one example of a configuration of the electronic apparatus.

FIG. 37 illustrates a drawing showing one example of a configuration of a communication device functioning as a name card.

FIG. 38 illustrates a drawing showing one example of a display of the electronic apparatus.

DETAILED DESCRIPTION

Figure 1:
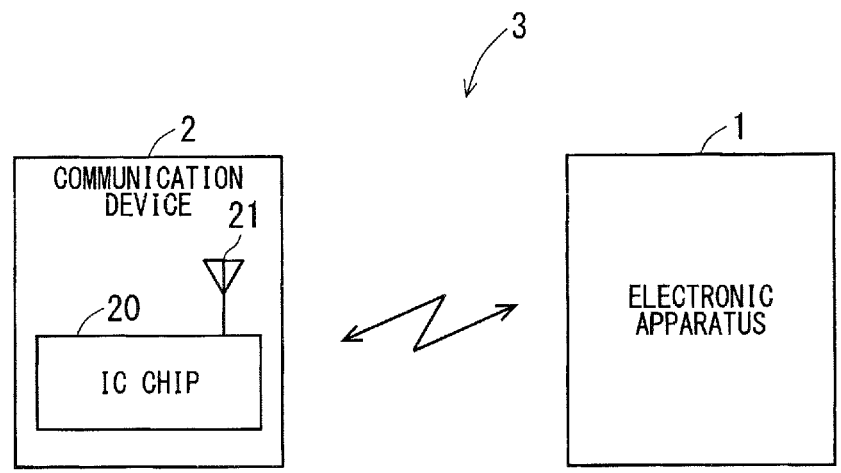
FIG. 1 illustrates a diagram showing one example of a configuration of an electronic apparatus system.

FIG. 1 is a diagram showing one example of a configuration of an electronic apparatus system 3. As shown in FIG. 1, the electronic apparatus system 3 comprises an electronic apparatus 1 and a communication device 2 which wirelessly communicates with the electronic apparatus 1. The electronic apparatus 1 is a mobile phone such as a smartphone, for example.

The communication device 2 has an IC chip 20 and an antenna 21 connected to the IC chip 20. An exterior of the communication device 2 has a card shape, for example, and the communication device 2 is referred to as an IC card. "IC" is an abbreviation for Integrated Circuit.

The IC chip 20 can perform a near field wireless communication with the electronic apparatus 1 using the antenna 21. The IC chip 20 can perform a wireless communication in accordance with Near Field Communication (NFC), for example, with the electronic apparatus 1. The antenna 21 is made up of a coil, for example. The electronic apparatus 1 functions as a reader, and can read various types of information stored in the IC chip 20 from the IC chip 20. A communication standard other than NFC may also be applied as a communication standard between the IC chip 20 and the electronic apparatus 1.

Figure 2:
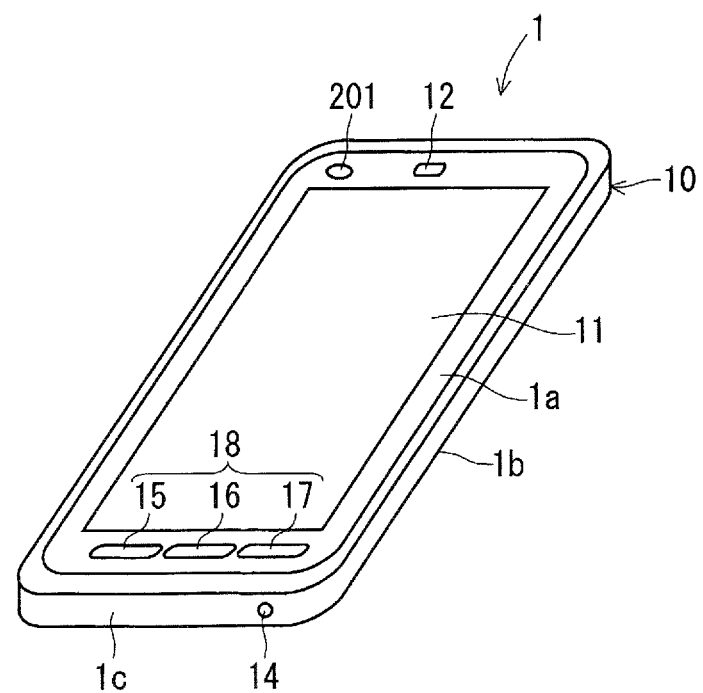
FIG. 2 illustrates a perspective view showing one example of an external appearance of an electronic apparatus.
Figure 3:
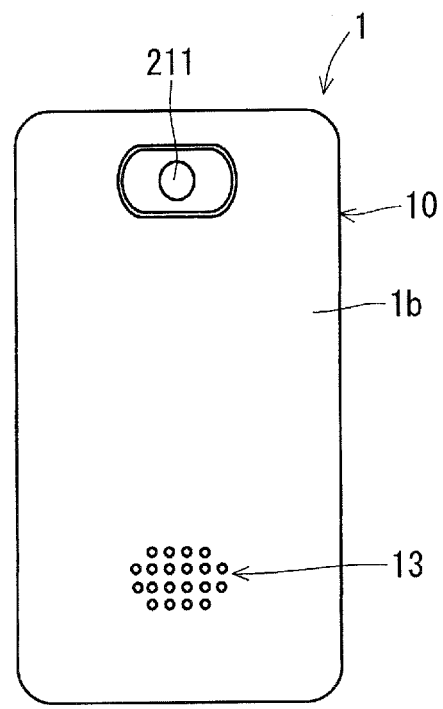
FIG. 3 illustrates a rear view showing one example of the external appearance of the electronic apparatus.

FIGS. 2 and 3 are a perspective view and a rear view showing one example of an external appearance of the electronic apparatus 1, respectively. As shown in FIGS. 2 and 3, the electronic apparatus 1 comprises an apparatus case 10 having a plate shape substantially rectangular in a plan view, for example. The apparatus case 10 constitutes an exterior of the electronic apparatus 1. A display region 11, in which various types of information such as characters, symbols, and graphics are displayed, is located in a front surface 1a of the electronic apparatus 1, in other words, a front surface of the apparatus case 10. A touch panel 220, which will be described below, is located in a rear surface side of the display region 11. Accordingly, a user can input various types of information to the electronic apparatus 1 by operating the display region 11 in the front surface 1a of the electronic apparatus 1 with his/her finger, for example. The user can also input the various types of information to the electronic apparatus 1 by operating the display region 11 with a pen for the touch panel such as a stylus pen, for example, instead of an operator such as his/her finger.

A receiver hole 12 is located in an upper end of the front surface 1a of the electronic apparatus 1 (the front surface of the apparatus case 10). A speaker hole 13 is located in a lower end of a rear surface 1b of the electronic apparatus 1. A microphone hole 14 is located in a lower side surface 1c of the electronic apparatus 1.

A lens 201 included in a first camera 200, which will be described below, can be visually recognized from the upper end of the front surface 1a of the electronic apparatus 1. As shown in FIG. 3, a lens 211 included in a second camera 210, which will be described below, can be visually recognized from an upper end of the rear surface 1b of the electronic apparatus 1.

An operation button group 18 having a plurality of operation buttons 15, 16, and 17 is located in a lower end of the front surface 1a of the electronic apparatus 1. Each of the operation buttons 15, 16, and 17 is a hardware button. Specifically, each of the operation buttons 15, 16, and 17 is a press button. Each of the operation buttons 15, 16, and 17 may also be a software button displayed in the display region 11.

The operation button 15 is a back button, for example. The back button is an operation button for switching a display in the display region 11 to an immediately preceding display. The user operates the operation button 15 to switch the display in the display region 11 to the immediately preceding display.

The operation button 16 is a home button, for example. The home button is an operation button for displaying a home screen in the display region 11. The user operates the operation button 16 to display the home screen in the display region 11.

The operation button 17 is a history button, for example. The history button is an operation button to display a history of an application executed by the electronic apparatus 1 in the display region 11. When the user operates the operation button 17, the history of the application executed by the electronic apparatus 1 is displayed in the display region 11.

<Electrical Configuration of Electronic Apparatus>

FIG. 4 is a block diagram mainly showing one example of an electrical configuration of the electronic apparatus 1. As shown in FIG. 4, the electronic apparatus 1 comprises a controller 100, a wireless communication unit 110, a near field wireless communication unit 120, a wireless LAN communication unit 130, a GPS receiver 140, a display 160, and an operation button group 18. The electronic apparatus 1 further comprises a receiver 170, a speaker 180, a microphone 190, the first camera 200, the second camera 210, the touch panel 220, and a battery 230. The apparatus case 10 houses these components included in the electronic apparatus 1.

The controller 100 is a type of arithmetic processing device, and is a type of electrical circuit. The controller 100 controls the other components of the electronic apparatus 1 to be able to collectively manage the operation of the electronic apparatus 1. The controller 100 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques. In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

As shown in FIG. 4, the controller 100 comprises a central processing unit (CPU) 101, a digital signal processor (DSP) 102, and a storage 103, for example. The controller 100 may further include a co-processor such as System-on-a-Chip (SoC), Micro Control Unit (MCU), and Field-programmable Gate Array (FPGA), for example. In this case, the controller 100 may make the CPU 101 and the co-processor cooperate with each other to perform various types of control, or may switch and use one of them to perform various types of control. The controller 100 is also considered as a control device 100.

The storage 103 comprises a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 1. The CPU 101 and the DSP 102 execute the various control programs 103a in the storage 103 to achieve various functions of the controller 100.

All or some of the functions of the controller 100 may be achieved by a hardware circuit that needs no software to achieve the functions above. The storage 103 may include a non-transitory computer readable recording medium other than the ROM and the RAM. The storage 103 may include, for example, a compact hard disk drive and a solid state drive (SSD).

The plurality of control programs 103a in the storage 103 include various applications (application programs). The storage 103 stores, for example, a call application to perform a voice call and a video call, a browser to display a website, and a mail application to create, browse, send, and receive an e-mail. The storage 103 also stores a camera application to take a picture of an object using the first camera 200 and the second camera 210, a map display application to display a map, and a music reproduction control application to control a reproduction of music data stored in the storage 103. The storage 103 may store at least one application in the storage 103 in advance. The electronic apparatus 1 may download the at least one application in the storage 103 from the other device and store it in the storage 103.

The wireless communication unit 110 comprises an antenna 111. The wireless communication unit 110 is also referred to as the wireless communication circuit. The wireless communication unit 110 can perform a wireless communication under control of the controller 100, using the antenna 111. The wireless communication unit 110 can perform the wireless communication in accordance with Long Term Evolution (LTE), Code Division Multiple Access (CDMA), or Universal Mobile Telecommunications System (UMTS), for example. The wireless communication unit 110 can receive a signal from a mobile phone different from the electronic apparatus 1 or a signal from a communication device such as a web server connected to Internet by the antenna 111 via a base station, for example. The wireless communication unit 110 can perform an amplification processing and a down-conversion on the received signal and output the processed signal to the controller 100. The controller 100 can perform a demodulation processing, for example, on the received signal which has been input, to obtain an image signal and a sound signal contained in the received signal. The wireless communication unit 110 can perform an up-conversion and an amplification processing on the transmitted signal, which has been generated in the controller 100, containing the image signal and the sound signal, and wirelessly transmit the transmitted signal which has been processed from the antenna 111. The mobile phone different from the electronic apparatus 1 or the communication device connected to Internet, for example, receives the transmitted signal from the antenna 111 via the base station, for example.

The near field wireless communication unit 120 has an antenna 121. The near field wireless communication unit 120 is also referred to as the near field wireless communication circuit. The near field wireless communication unit 120 can perform a near field wireless communication under control of the controller 100, using the antenna 121. The near field wireless communication unit 120 can perform a near field wireless communication in accordance with NFC, for example, with the IC chip 20 of the communication device 2. The near field wireless communication unit 120 can communicate with the IC chip 20 and obtain the various types of information in the IC chip 20. The near field wireless communication unit 120 can output the information obtained from the IC chip 20 to the controller 100. A communication distance from the near field wireless communication unit 120 to the IC chip 20 is approximately 10 cm, for example. The antenna 121 is made up of a coil, for example.

The wireless LAN communication unit 130 has an antenna 131. The wireless LAN communication unit 130 is also referred to as the wireless LAN communication circuit. The wireless LAN communication unit 130 can perform a wireless communication under control of the controller 100, using the antenna 131. The wireless LAN communication unit 130 can perform a wireless communication with the communication device using a wireless local area network (LAN) such as WiFi.

The GPS receiver 140 has an antenna 141. The GPS receiver 140 is also referred to as the GPS receiving circuit. The GPS receiver 140 can receive a wireless signal from a satellite of Global Positioning System (GPS) under control of the controller 100, using the antenna 141. The GPS receiver 140 can calculate a current position of the electronic apparatus 1 based on the received wireless signal. The current position obtained by the GPS receiver 140 is input to the controller 100.

When the user operates the operation buttons 15, 16, and 17 of the operation button group 18, each of the operation buttons 15, 16, and 17 can output to the controller 100 an operation signal indicating that each of the operation buttons 15, 16, and 17 has been operated. The controller 100 can accordingly determine whether or not each operation button has been operated for each of the operation buttons 15, 16, and 17. The controller 100 to which the operation signal is input controls the other component, thereby causing the electronic apparatus 1 to execute the function allocated to the operated operation button described above.

The display 160 has the display region 11 located in the front surface 1a of the electronic apparatus 1 and a display panel 150. The display 160 can display various types of information in the display region 11. The display panel 150 is a liquid crystal display panel or an organic EL panel, for example. The display panel 150 can display various types of information such as characters, symbols, and graphics under control of the controller 100. The display panel 150 is disposed to face the display region 11 in the apparatus case 10. The information displayed on the display panel 150 is displayed in the display region 11.

The touch panel 220 can detect an operation performed on the display region 11 with the operator such as the finger. The touch panel 220 is, for example, a projected capacitive touch panel, and is disposed on a rear side of the display region 11. The touch panel 220 may be disposed between the display region 11 and the display panel 150. A part of the touch panel 220 may be embedded in the display panel 150. When the user performs the operation on the display region 11 with the operator such as his/her finger, the touch panel 220 can input, to the controller 100, an electrical signal in accordance with the operation. The controller 100 can specify contents of the operation performed on the display region 11 based on the electrical signal from the touch panel 220 and performs processing in accordance with the contents.

The microphone 190 can convert a sound from the outside of the electronic apparatus 1 into an electrical sound signal and then output the electrical sound signal to the controller 100. The sound from the outside of the electronic apparatus 1 is taken inside the electronic apparatus 1 through the microphone hole 14 and input to the microphone 190.

The speaker 180 is, for example, a dynamic speaker. The speaker 180 can convert an electrical sound signal from the controller 100 into a sound and then output the sound. The sound being output from the speaker 180 is output outside through the speaker hole 13. The sound being output from the speaker hole 13 can be heard in a place apart from the electronic apparatus 1.

The receiver 170 can output a received sound. The receiver 170 is made up of, for example, a dynamic speaker. The receiver 170 can convert an electrical sound signal from the controller 100 into a sound and then output the sound. The sound being output from the receiver 170 is output outside through the receiver hole 12. A volume of the sound being output through the receiver hole 12 is set to be smaller than a volume of the sound being output through the speaker hole 13. The sound being output through the receiver hole 12 can be heard when the user brings the receiver hole 12 close to his/her ear. A vibration element such as a piezoelectric vibration element for causing a portion of the front surface of the apparatus case 10 to vibrate may be provided instead of the receiver 170 to transmit the sound from the portion of the front surface to the user.

The first camera 200 has the lens 201 and an imaging element, for example. The second camera 210 has the lens 211 and an imaging element, for example. Each of the first camera 200 and the second camera 210 can take an image of an object under control of the controller 100, generate a still image or a video of the object, and then output the still image or the video to the controller 100.

The lens 201 of the first camera 200 can be visually recognized from the front surface 1a of the electronic apparatus 1. Accordingly, the first camera 200 can take an image of an object located on a side of the front surface 1a (a side of the display region 11) of the electronic apparatus 1. The lens 211 of the second camera 210 can be visually recognized from the rear surface 1b of the electronic apparatus 1. Accordingly, the second camera 210 can take an image of an object located on the side of the rear surface 1b of the electronic apparatus 1.

The battery 230 can output a power source for the electronic apparatus 1. The battery 230 is, for example, a rechargeable battery. The battery 230 can supply the power source to various components such as the controller 100 and the wireless communication unit 110 included in the electronic apparatus 1.

<Method of Using Electronic Apparatus and Communication Device>

Figure 5:
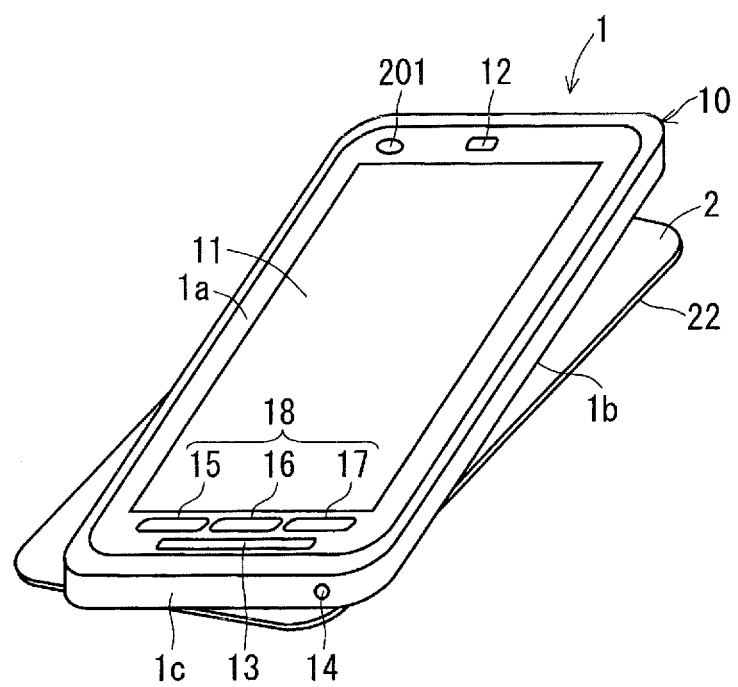
FIG. 5 illustrates a perspective view showing one example of an external appearance of the electronic apparatus and a communication device.

FIG. 5 is a perspective view showing an external appearance of the electronic apparatus 1 and the communication device 2. As shown in FIG. 5, a case 22 of the communication device 2 has a card shape. The case 22 houses the IC chip 20 and the antenna 21. An outer shape of the communication device 2 is not limited to the example in FIG. 5.

Figure 6:
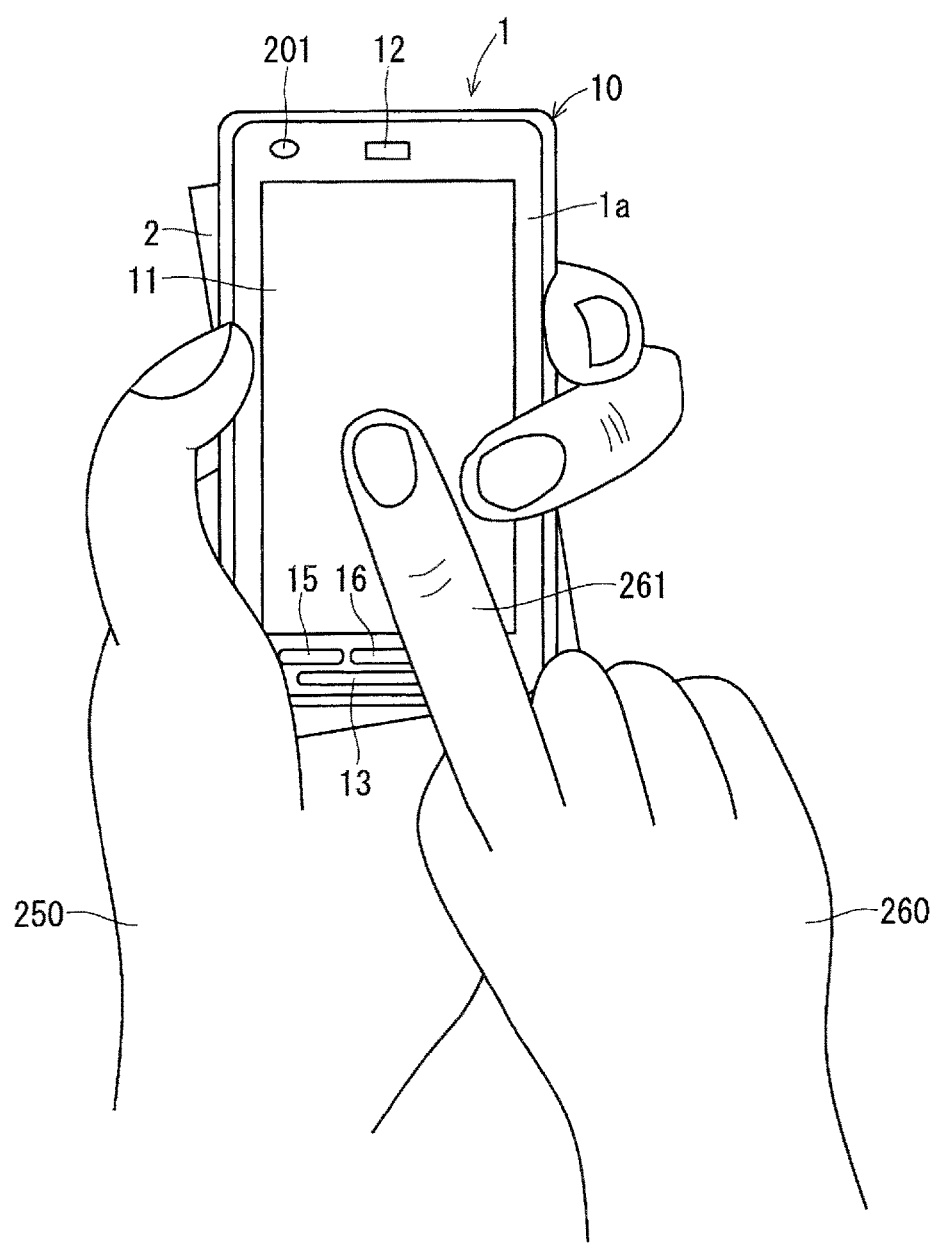
FIG. 6 illustrates a drawing showing one example of the operation performed on the electronic apparatus by a user having the electronic apparatus and the communication device.

As described above, in the present example, the communication distance from the electronic apparatus 1 to the IC chip 20 is approximately 10 cm. The near field wireless communication unit 120 is located closer to the rear surface 1b than the front surface 1a of the electronic apparatus 1 in the apparatus case 10, for example. Accordingly, the user places the communication device 2 on the rear surface 1b of the electronic apparatus 1 as shown in FIG. 5 to communicate the electronic apparatus 1 and the IC chip 20 with each other. As shown in FIG. 6, the user operates the display region 11 in the electronic apparatus 1 with his/her finger with the electronic apparatus 1 and the communication device 2 in one hand so that the communication device 2 is placed on the rear surface 1b of the electronic apparatus 1. The hand operating the display region 11 may be the same as the hand holding the electronic apparatus 1 and the communication device 2, or may be different from the hand holding the electronic apparatus 1 and the communication device 2. In the example in FIG. 6, the user operates the display region 11 in the electronic apparatus 1 with an index finger 261 of a right hand 260 with the electronic apparatus 1 and the communication device 2 in a left hand 250. A way of holding the electronic apparatus 1 and the communication device 2 is not limited thereto.

<Operation of Electronic Apparatus>

If a distance from the electronic apparatus 1 to the communication device 2 decreases, a predetermined application stored in the storage 103 is activated in the electronic apparatus 1. This application is referred to as a "subject application".

Figure 7:
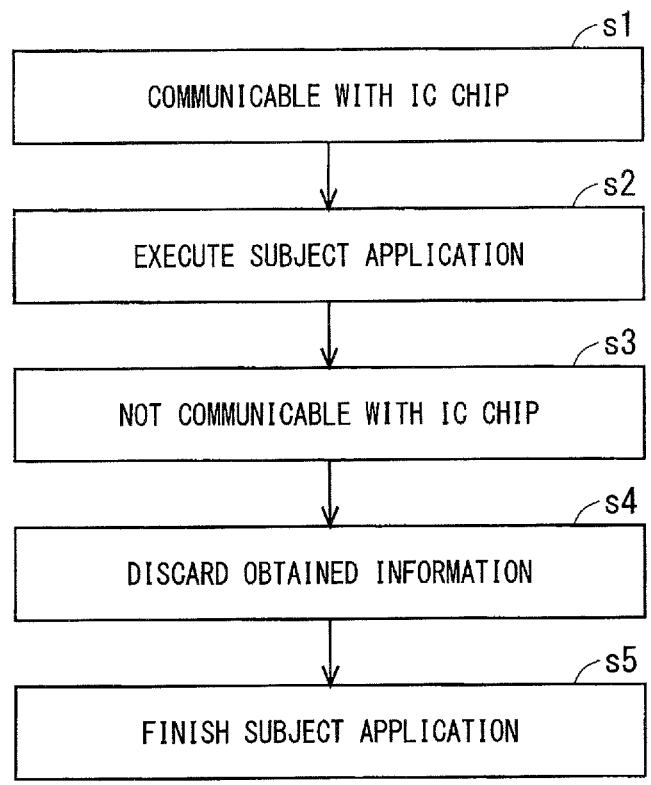
FIG. 7 illustrates a flow chart showing one example of an operation of the electronic apparatus.

FIG. 7 is a flow chart showing one example of an operation of the electronic apparatus 1. As shown in FIG. 7, the controller 100 executes Step s2 if the near field wireless communication unit 120 can communicate with the IC chip 20 in Step s1.

At this time, if the distance to the electronic apparatus 1 decreases, an inductive current flows in the antenna (coil) 21 connected to the IC chip 20 by a magnetic field generated by the antenna (coil) 121 of the near field wireless communication unit 120 of the electronic apparatus 1 in the communication device 2. The power is thereby supplied to the IC chip 20. The IC chip 20 transmits a signal based on the supplied power. If the near field wireless communication unit 120 receives the signal from the IC chip 20 in Step s1, the controller 100 determines that the near field wireless communication unit 120 can communicate with the IC chip 20, and then executes Step s2.

In Step s2, the controller 100 executes the subject application in the storage 103. Accordingly, if the distance from the electronic apparatus 1 to the communication device 2 decreases, the subject application is activated in the electronic apparatus 1.

The controller 100 reads out the information in the IC chip 20 via the near field wireless communication unit 120 in the subject application. The controller 100 performs the various types of processing based on the information which the near field wireless communication unit 120 obtains from the IC chip 20 (simply referred to as the "obtained information" hereinafter in some cases) in the subject application. The storage 103 stores the obtained information. A specific example of the processing performed by the controller 100 based on the obtained information is described hereinafter.

After Step s2, if the near field wireless communication unit 120 cannot communicate with the IC chip 20 in Step s3, the controller 100 executes Step s4. If the near field wireless communication unit 120 cannot receive the signal from the IC chip 20, the controller 100 determines that the near field wireless communication unit 120 cannot communicate with the IC chip 20, and then executes Step s4.

In Step s4, the controller 100 discards the obtained information obtained from the IC chip 20 in the subject application. Specifically, the controller 100 deletes the obtained information in the storage 103 from the storage 103. Then, the controller 100 finishes the subject application in Step s5. Subsequently, if the near field wireless communication unit 120 can communicate with the IC chip 20 in Step s1, the controller 100 executes Step s2, and then operates in the similar manner. The order of Step s4 and Step s5 may be reversed.

If the user performs a predetermined operation on the display region 11 to instruct the electronic apparatus 1 to finish the subject application in a state where the subject application is executed, the controller 100 finishes the subject application.

As described above, when the near field wireless communication unit 120 becomes unable to communicate with the IC chip 20, the controller 100 discards the obtained information obtained from the IC chip 20. The storage capacity of the storage 103 of the electronic apparatus 1 can be thereby efficiently used. If the distance from the electronic apparatus 1 to the communication device 2 increases, the near field wireless communication unit 120 becomes unable to communicate with the IC chip 20. Accordingly, if distance from the electronic apparatus 1 to the communication device 2 increases, the obtained information is automatically discarded from the electronic apparatus 1.

The controller 100 may also discard the information generated by executing the subject application in Step s4. That is to say, the controller 100 may delete the information generated based on the obtained information in the processing based on the obtained information in the subject application. The storage capacity of the storage 103 can be thereby further efficiently used.

If the user performs a predetermined operation on the display region 11 to instruct the electronic apparatus 1 to execute the subject application in a state where the subject application is not executed, the controller 100 executes the subject application. When the near field wireless communication unit 120 can communicate with the IC chip 20 after the subject application is executed, the controller 100 obtains the information from the IC chip 20. Accordingly, the user can make the electronic apparatus 1 obtain the information in the IC chip 20 by reducing the distance from the electronic apparatus 1 to the communication device 2 after instructing the electronic apparatus 1 to execute the subject application.

<Usage Example of Communication Device and Operation Example of Electronic Apparatus>

Described hereinafter are a usage example of the communication device 2 having the IC chip 20 and an operation example of the electronic apparatus 1 according to the usage example.

<Usage of Communication Device as Advertising Medium>

Figure 8:
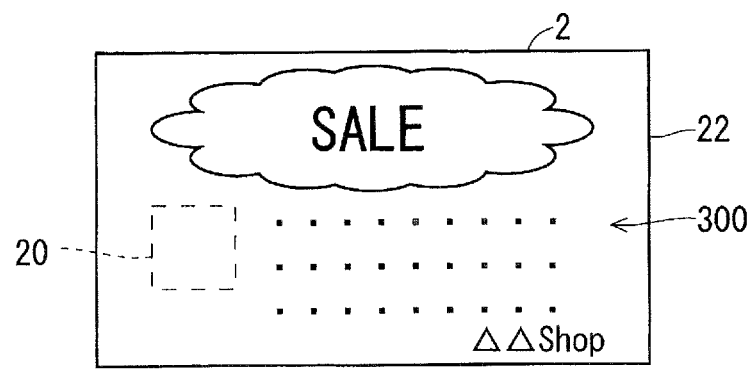
FIG. 8 illustrates a drawing showing one example of a communication device functioning as an advertising medium.

In the present example, the communication device 2 is used as an advertising medium such as a leaflet or a direct mail. FIG. 8 is a drawing showing one example of the communication device 2 used as an advertising medium. In the example in FIG. 8, the communication device 2 is used as an advertising medium for a sale of a shop, for example.

Brief information 300 on the sale is printed on a surface of the case 22 of the communication device 2.

Figure 9:
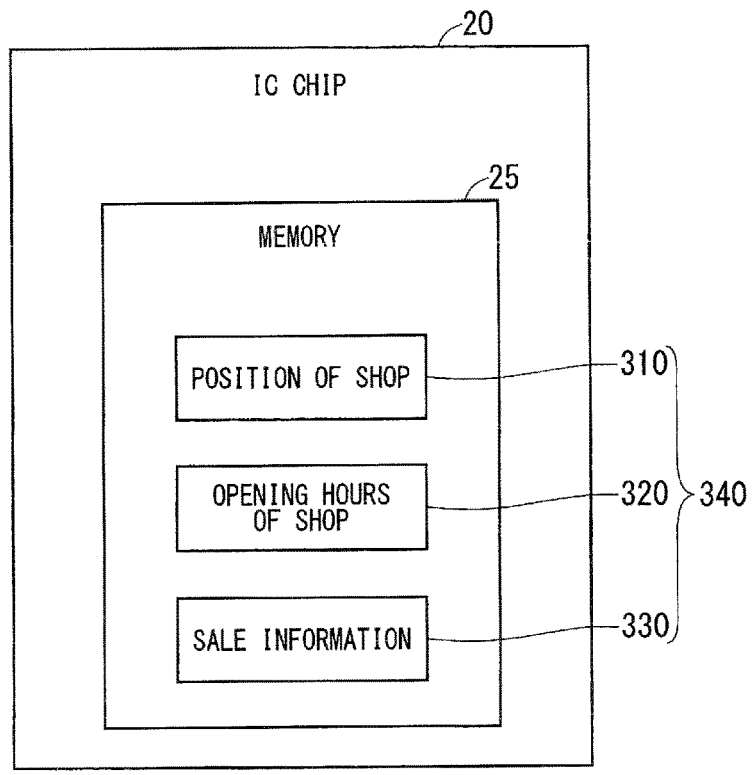
FIG. 9 illustrates a drawing showing one example of information stored in an IC chip.

FIG. 9 is a drawing showing one example of information stored in the IC chip 20 of the communication device 2 shown in FIG. 8. As shown in FIG. 9, a memory 25 of the IC chip 20 stores shop information 340 regarding a shop. The shop information 340 comprises a position of the shop 310, opening hours of the shop 320, and detailed sale information 330, for example. The shop information 340 does not need to comprise some of the position of the shop 310, the opening hours of the shop 320, and the sale information 330. The shop information 340 may include information other than the position of the shop 310, the opening hours of the shop 320, and the sale information 330 such as campaign information and information regarding the other partner shop, for example.

Figure 10:
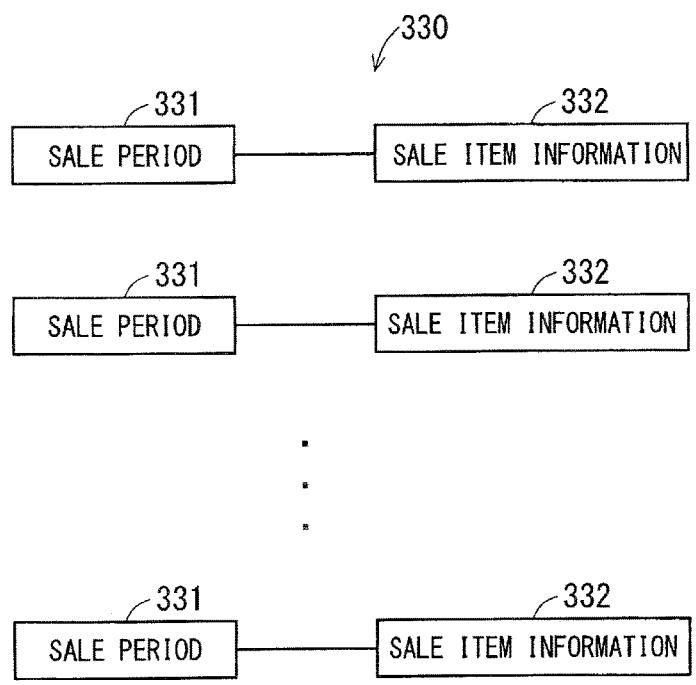
FIG. 10 illustrates a drawing showing one example of sale information.

FIG. 10 is a drawing showing one example of the sale information 330. As shown in FIG. 10, the sale information 330 comprises a plurality of sale periods 331, for example. In the sale information 330, sale item information 332 regarding a sale item sold in each sale period 331 is associated with each sale period 331. The sale item information 332 contains an image, a name, a sale price, and a discount rate of each sale item sold in the sale period 331 corresponding to the sale item information 332.

If the distance from the communication device 2 having such a configuration to the electronic apparatus 1 decreases, the controller 100 executes the subject application in the storage 103 in the electronic apparatus 1. The controller 100 performs processing of controlling the display of the display 160 in the subject application based on the obtained information which the near field wireless communication unit 120 has obtained from the IC chip 20 of the communication device 2, a current time, a current date, and a current position of the electronic apparatus 1. An operation of the controller 100 according to the present modification example is described in detail hereinafter.

Figure 11:
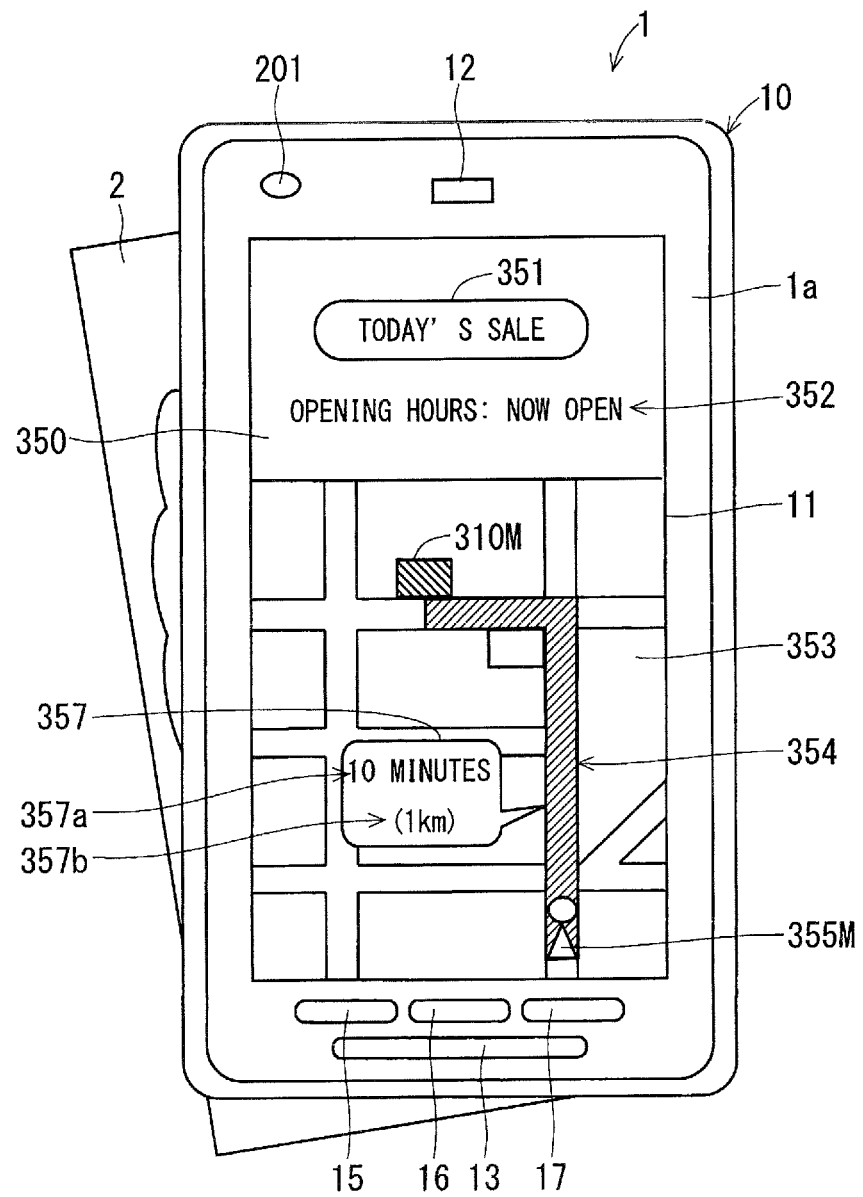
FIG. 11 illustrates a drawing showing one example of a display of the electronic apparatus.

Upon starting the execution of the subject application, the controller 100 makes the display 160 display a screen 350 shown in FIG. 11, for example, based on the obtained information. The screen 350 displayed in the display region 11 shows a map 353 including the current position of the electronic apparatus 1 and the position of the shop 310. A mark 355M indicating the current position of the electronic apparatus 1 and a mark 310M indicating the position of the shop 310 are shown on the map 353. A route 354 from the current position of the electronic apparatus 1 to the position of the shop 310 is shown on the map 353. In other words, the route 354 from a position of the user holding the electronic apparatus 1 to the position of the shop 310 is shown on the map 353.

The screen 350 shows information 357 regarding the route 354. The information 357 comprises a time 357a taken to go from the current position of the electronic apparatus 1 to the position of the shop 310 and a distance 357b from the current position of the electronic apparatus 1 to the position of the shop 310, for example. The time 357a is a travel time by foot, for example.

The controller 100 executing the subject application obtains the route 354 on the map 353 based on the position of the shop 310 included in the obtained information obtained from the IC chip 20 and the position of the electronic apparatus 1 obtained from the GPS receiver 140. Then, the controller 100 makes the display 160 display the obtained route 354 on the map 353. In a case where the storage 103 stores the map 353, the controller 100 may use the map 353 in the storage 103. The controller 100 may obtain the map 353 from a Web server providing map information via the wireless communication unit 110.

The controller 100 obtains the time 357a and the distance 357b based on the position of the shop 310 and the position of the electronic apparatus 1 obtained from the GPS receiver 140. Then, the controller 100 makes the display 160 display the information 357 including the time 357a and the distance 357b.

The screen 350 comprises a sale item button 351 for displaying the sale item information 332 regarding today's sale item and information 352 indicating whether or not the shop currently opens as well as the route 354 described above. In the example in FIG. 11, the information 352 indicates that the shop currently opens.

The controller 100 compares the opening hours of the shop 320 included in the obtained information obtained from the IC chip 20 and the current time to determine whether or not the shop currently opens. Specifically, if the current time falls within the opening hours 320, the controller 100 determines that the shop currently opens. In the meanwhile, if the current time does not fall within the opening hours 320, the controller 100 determines that the shop does not currently open. Then, the controller 100 makes the display 160 display the information 352 based on the determination result whether or not the shop currently opens. The controller 100 uses a current time (a network time) transmitted by a base station with which the wireless communication unit 110 communicates, for example, as the current time used to determine whether or not the shop currently opens. The controller 100 may use a time obtained by a real time clock (RTC), which is provided in the electronic apparatus 1 but not shown, as the current time. If the shop does not currently open, the screen 350 shows a character string of "CLOSE", for example, instead of a character string of "NOW OPEN" shown in FIG. 11.

Figure 12:
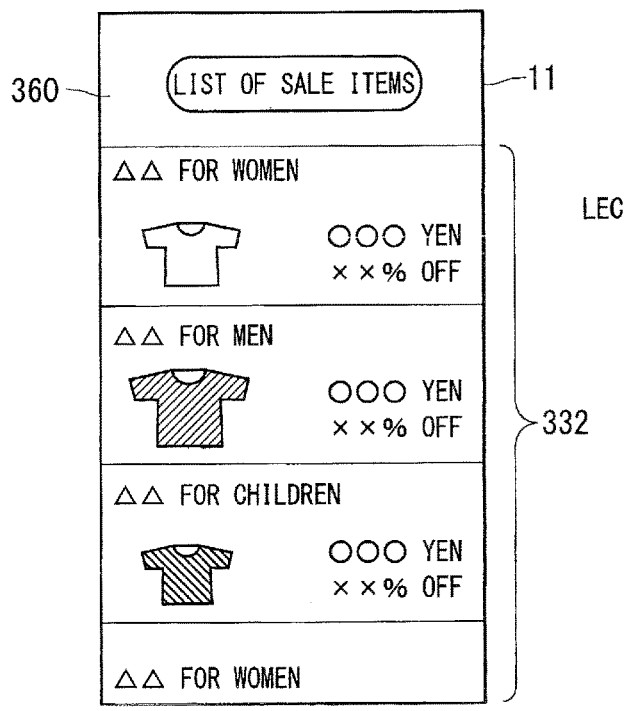
FIG. 12 illustrates a drawing showing one example of a display of the electronic apparatus.

If the user performs a predetermined operation (a tap operation, for example) on the sale item button 351 with his/her finger, the controller 100 makes the display 160 display the screen 360 shown in FIG. 12, for example. The screen 360 is thereby displayed in the display region 11. The screen 360 comprises the sale item information 332 regarding the today's sale item. The controller 100 obtains the sale item information 332 regarding the today's sale item from the sale information 330 included in the obtained information obtained from the IC chip 20. Specifically, the controller 100 compares each sale period 331 included in the sale information 330 and the current date, thereby specifying the sale period 331 including the current date. Then, the controller 100 sets, in the sale information 330, the sale item information 332 corresponding to the specified sale period 331 to the sale item information 332 regarding the today's sale item. The controller 100 makes the display 160 display a screen 360 including the sale item information 332 regarding the today's sale item. The user can make the electronic apparatus 1 perform a scroll display of the screen 360 by performing a slide operation in an up and down direction on the display region 11, for example.

The controller 100 uses a current date (a network date) transmitted by a base station with which the wireless communication unit 110 communicates, for example, as the current date used to obtain the sale item information 332 regarding the today's sale item. The controller 100 may use a date obtained by a real time clock of the electronic apparatus 1 as the current date.

If the sale information 330 does not comprise the sale period 331 which includes the current date, the controller 100 may make the display 160 display notification information for notifying the user that the sale is finished instead of the sale item button 351.

If the controller 100 determines that the near field wireless communication unit 120 cannot communicate with the IC chip 20 due to an increase in the distance from the electronic apparatus 1 to the communication device 2, for example, the controller 100 discards the obtained information obtained from the IC chip 20 of the storage 103, that is to say, the position of the shop 310, the opening hours of the shop 320, and the sale information 330. Furthermore, the controller 100 discards all of the information generated based on the obtained information. Specifically, the controller 100 discards the information 352 and 357, the route 354, and the marks 310M and 355M included in the screen 350. The screen 360 does not include the information generated based on the obtained information.

Upon discarding the obtained information and the information generated based on the obtained information, the controller 100 finishes the subject application. When the subject application is finished, a standby screen, for example, is displayed in the display region 11, in the state where the near field wireless communication unit 120 cannot communicate with the IC chip 20, the electronic apparatus 1 does not display the screens 350 and 360.

As described above, in the electronic apparatus 1, if the distance to the communication device 2 increases, the obtained information obtained from the IC chip 20 and the information generated based on the obtained information are discarded. Accordingly, if the user takes the communication device 2 placed on the electronic apparatus 1 from the electronic apparatus or takes the electronic apparatus 1 placed on the communication device 2 from the communication device 2, the obtained information obtained from the IC chip 20 of the communication device 2 and the information generated based on the obtained information are discarded in the electronic apparatus 1. Advertising information such as the sale information 330 included in the obtained information is often transient information necessary for the user for only a certain period of time, thus may be unnecessary for the user after an elapse of the certain period of time. Since the advertising information obtained from the IC chip 20 and the information generated based on the advertising information are discarded from the electronic apparatus 1, it can be suppressed that the information which is no longer necessary for the user is indefinitely stored in the electronic apparatus 1.

Since the obtained information obtained from the IC chip 20 is discarded in the electronic apparatus 1, the storage capacity of the electronic apparatus 1 can be efficiently used even if the IC chip 20 stores much information. Accordingly, the IC chip 20 can store as much information as possible, and as a result, the electronic apparatus 1 can reduce the need to communicate with an external device connected to Internet, for example, to obtain the information from the external device. Thus, if the communication between the electronic apparatus 1 and the external device puts the user to expense, the communication expense can be reduced.

In the present example, the electronic apparatus 1 does not simply display the obtained information from the IC chip 20 but displays the information generated based on the obtained information, thus can provide the user with the information appropriate to the user.

In the present example, the controller 100 does not use all of the obtained information but selects the information to be used from the obtained information based on predetermined information when the controller 100 makes the display 160 perform the display based on the obtained information. That is to say, the controller 100 selects the sale item information 332 corresponding to the current date (specifically, the sale item information 332 corresponding to the sale period 331 including the current date) from the obtained information as the information to be used, and does not use the other sale item information 332. Thus, the controller 100 can perform the processing using the information necessary for the user. If the controller 100 controls the display of the display 160 as the present example, the user can be appropriately provided with the information necessary for the user.

Figure 13:
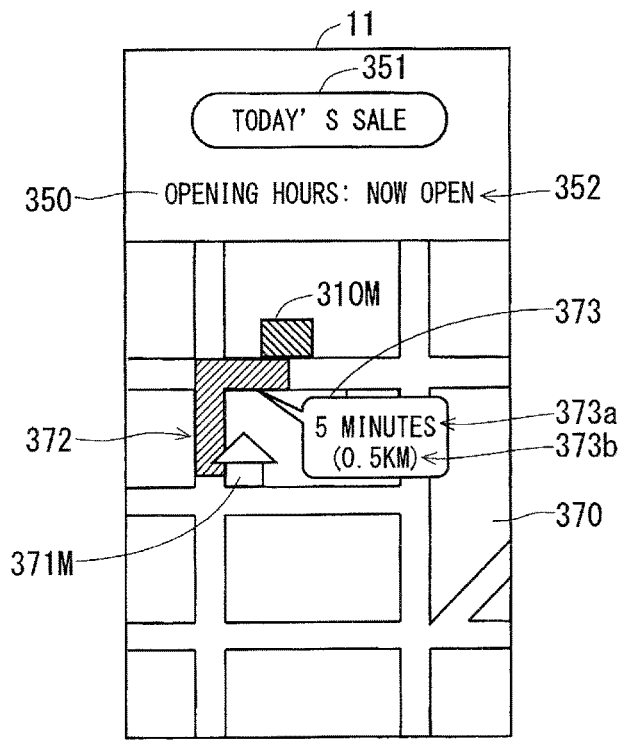
FIG. 13 illustrates a drawing showing one example of a display of the electronic apparatus.

Although the screen 350 shows the route 354 from the current position of the electronic apparatus 1 to the position of the shop 310 in the example described above, the screen 350 may show a route from a predetermined position different from the current position of the electronic apparatus 1 to the position of the shop 310. As shown in FIG. 13, the screen 350 may show a route 372 from an address of the user (an address of a user's home) to the position of the shop 310, for example. In the example in FIG. 13, the screen 350 shows a map 370 including the address of the user and the position of the shop 310. The route 372 is shown on the map 370. A mark 371M indicating the address of the user is shown on the map 370. The screen 350 shows information 373 regarding the route 372. The information 373 comprises a time 373a taken to go from the address of the user to the position of the shop 310 and a distance 373b from the address of the user to the position of the shop 310, for example. The time 373a is a travel time by foot, for example. The storage 103 stores the address of the user. The storage 103 stores user information which is information regarding the user, and the user information includes the address of the user. If the user information includes the other position different from the address of the user, the screen 350 may show a route from the other position to the position of the shop 310. A business address of the user, for example, is considered as the other position.

The controller 100 may make the display 160 display one of the routes 354 and 372 in accordance with an instruction from the user. In this case, the user can instruct the electronic apparatus 1 to display the route 354 or display the route 372 by operating the display region 11, for example. For example, if the user performs a predetermined operation on a region where the map 353 is displayed in the display region 11 in the state where the screen 350 shown in FIG. 11 is displayed in the display region 11, the controller 100 makes the display 160 display the screen 350 shown in FIG. 13 instead of the screen 350 shown in FIG. 11. If the user performs a predetermined operation on a region where the map 370 is displayed in the display region 11 in the state where the screen 350 shown in FIG. 13 is displayed in the display region 11, the controller 100 makes the display 160 display the screen 350 shown in FIG. 11 instead of the screen 350 shown in FIG. 13. The controller 100 may make the display 160 display information of both the routes 354 and 372 at the same time.

Figure 14:
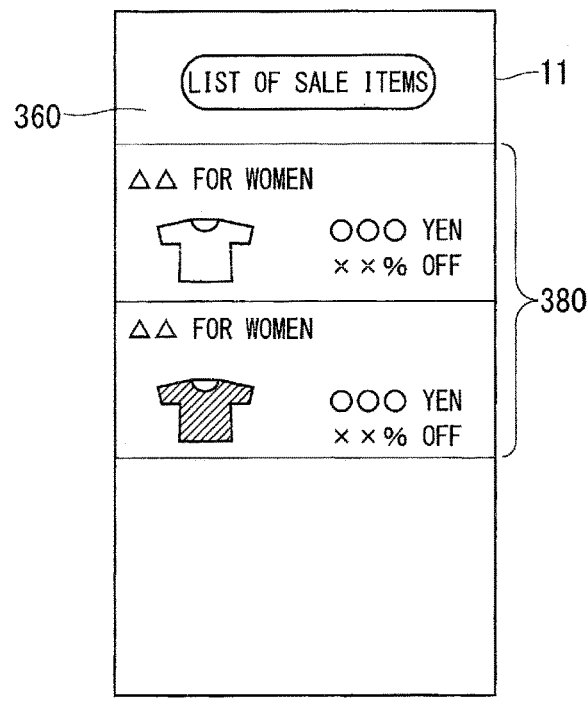
FIG. 14 illustrates a drawing showing one example of a display of the electronic apparatus.

The controller 100 may select the information to be used from the obtained information obtained from the IC chip 20 based on the user information in the storage 103. For example, a case where the user information includes a sex of the user is considered. In this case, the controller 100 sets information 380 corresponding to the sex of the user in the sale item information 332 regarding the today's sale item to the information to be used. Then, if the sale item button 351 in the screen 350 is operated, the controller 100 makes the display 160 display the screen 360 comprising the information 380 corresponding to the sex of the user. FIG. 14 shows one example of the screen 360 comprising the information 380 corresponding to the sex of the user. In the example in FIG. 14, the sex of the user is female, and the screen 360 comprises the information 380 corresponding to women. The information 380 corresponding to the women is made up of information regarding a sale of women's items. The controller 100 obtains the information regarding the sale of the women's items from the sale item information 332 regarding the today's sale item as the information 380, and makes the display 160 display the obtained information 380.

Figure 15:
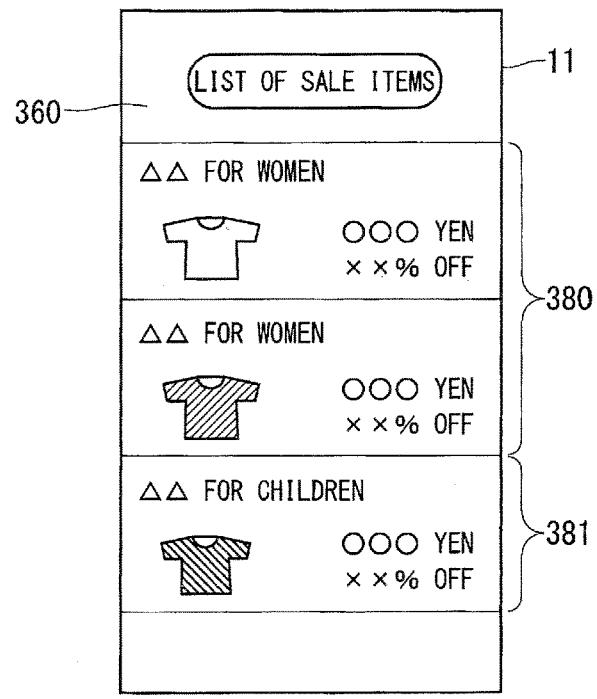
FIG. 15 illustrates a drawing showing one example of a display of the electronic apparatus.

If the user information includes the sex of the user and information indicating that the user has a child (referred to as the "information of having the child" hereinafter), the controller 100 may select the information 380 corresponding to the sex of the user and information 381 corresponding to the information of having the child from the obtained information as the information to be used. FIG. 15 shows one example of the screen 360 comprising the information 380 corresponding to the sex of the user and the information 381 corresponding to the information of having the child. In the example in FIG. 15, the sex of the user is female, and the screen 360 comprising the information 380 corresponding to the female. The information 380 corresponding to the women includes the information regarding a sale of women's items. In the example in FIG. 15, the information 381 corresponding to the information of having the child includes the information regarding a sale of children's items. The controller 100 obtains the information regarding the sale of the women's items from the sale item information 332 regarding the today's sale item as the information 380, and obtains the information regarding the sale of the children's items as the information 381. Then, the controller 100 makes the display 160 display the obtained information 380 and 381.

As described above, the controller 100 can perform the processing using the information more necessary for the user in the obtained information by selecting the information to be used from the obtained information based on the plurality pieces of information included in the user information.

Figure 16:
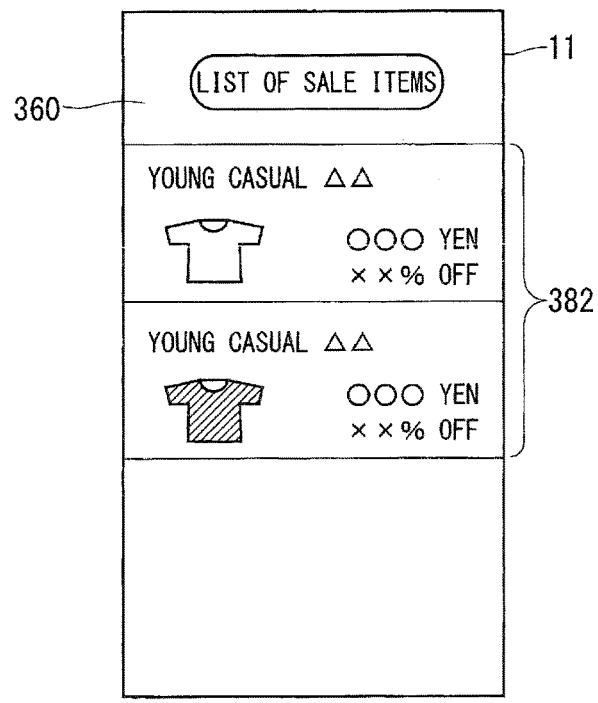
FIG. 16 illustrates a drawing showing one example of a display of the electronic apparatus.

If the user information includes an age of the user, the controller 100 may select information 382 corresponding to the age of the user as the information to be used from the obtained information. FIG. 16 shows one example of the screen 360 comprising the information 382 corresponding to the age of the user. In the example in FIG. 16, the age of the user is twenties, and the information 382 corresponding to the age of the user is made up of information regarding a sale of young people's items. The controller 100 obtains the information regarding the sale of the young people's items from the sale item information 332 regarding the today's sale item as the information 382, and makes the display 160 display the obtained information 382.

The controller 100 may select the information to be used from the obtained information based on information instructed by the user in the user information in the storage 103. In this case, the user can designate the information used when the controller 100 selects the information to be used for the electronic apparatus 1 by operating the display region 11, for example.

Figure 17:
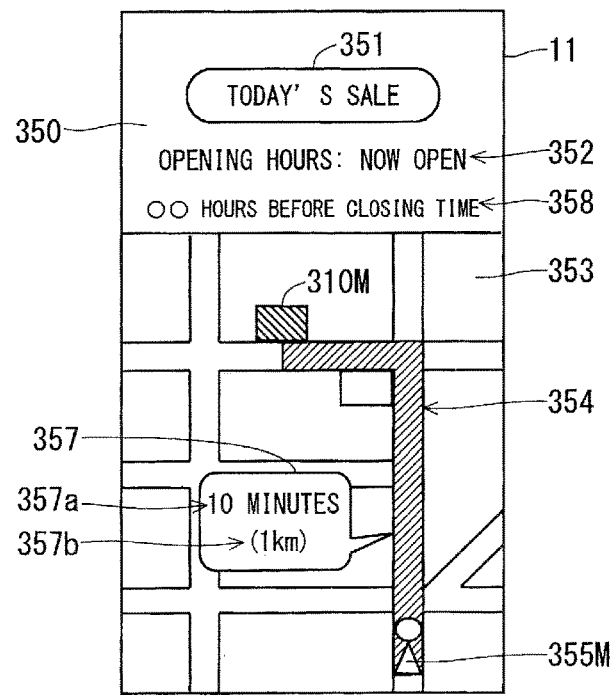
FIG. 17 illustrates a drawing showing one example of a display of the electronic apparatus.

As shown in FIG. 17, the controller 100 may comprise information 358 including a time from current time to a closing time of the shop in the screen 350. The controller 100 comprises the information 358 made up of a character string of "○○hours before closing time.", for example, in the screen 350. In this case, the controller 100 obtains the closing time of the shop from the opening hours of the shop 320 included in the obtained information. Then, the controller 100 obtains the time from the current time to the closing time of the shop based on the closing time of the shop and the current time of the shop.

Figure 18:
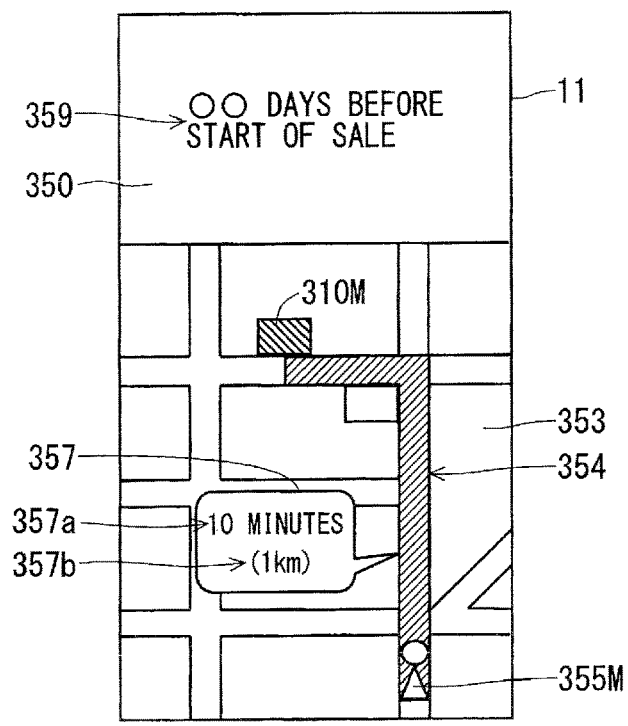
FIG. 18 illustrates a drawing showing one example of a display of the electronic apparatus.

If the sale of the shop is not started as shown in FIG. 18, the controller 100 may comprise, in the screen 350, information 359 including a total number of days from the current date to the start of the sale of the shop instead of the sale item button 351 and the information 352. The controller 100 comprises the information 359 made up of a character string of "◯◯days before start of sale.", for example, in the screen 350. In this case, the controller 100 specifies the sale period 331 which comes earliest in the plurality of the sale periods 331 included in the obtained information. Then, if the current date is earlier than the sale period 331 which comes earliest, the controller 100 obtains the number of days from the current date to the start of the sale of the shop based on the current date and the sale period 331 which comes earliest.

The IC chip 20 may store the shop information 340 regarding a plurality of shops (a plurality of group shops, for example). In this case, the controller 100 may set, to the information to be used, the shop information 340 regarding a shop closest to the current position of the electronic apparatus 1 or the position included in the user information (the address of the user, for example) in the shop information 340 regarding the plurality of shops. In this case, the controller 100 makes the display 160 display, in the manner similar to the routes 354 and 372, a route from the current position of the electronic apparatus 1 to the position of the shop 310 closest to the current position or a route from the position included in the user information to the position of the shop 310 closest to the position included in the user information. At this time, the display 160 displays the position of the shop 310 closest to the current position of the electronic apparatus 1 or the position included in the user information. The controller 100 makes the display 160 display the information 352 indicating whether or not the shop closest to the current position of the electronic apparatus 1 or the position included in the user information currently opens. If the sale item button 351 is operated, the controller 100 makes the display 160 display the sale item information 332 regarding the today's sale item of the shop closest to the current position of the electronic apparatus 1 or the position included in the user information. It is also applicable that the controller 100 can designate the shop information 340 to be used in the shop information 340 of the plurality of shops by the operation performed by the user on the display region 11. The controller 100 may switch the plurality of screens 350 corresponding to the plurality of shops, respectively, in accordance with the instruction from the user and make the display 160 display them.

<Usage of Communication Device as Ticket>

Figure 19:
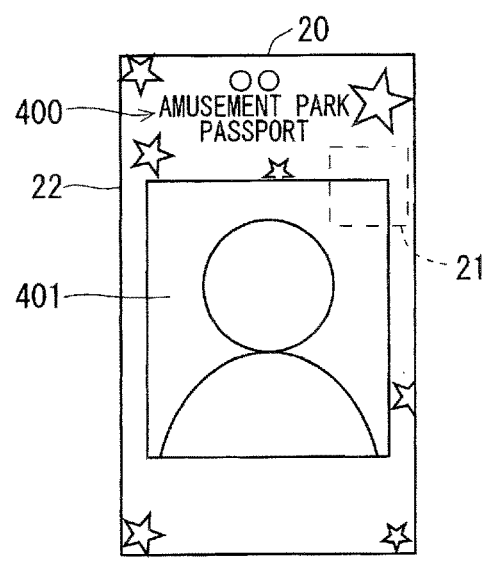
FIG. 19 illustrates a drawing showing one example of a communication device functioning as a ticket.

In the present example, the communication device 2 is used as a ticket for a commercial facility, an amusement park, or a theme park, for example. FIG. 19 is a drawing showing one example of the communication device 2 used as the ticket. In the example in FIG. 19, the communication device 2 functions as a passport ticket which can be used for one year in the amusement park. Information 400 indicating that the communication device 2 functions as the passport ticket and a face image 401 of an owner of the communication device 2 as the passport ticket, for example, are printed on the surface of the case 22 of the communication device 2.

Figure 20:
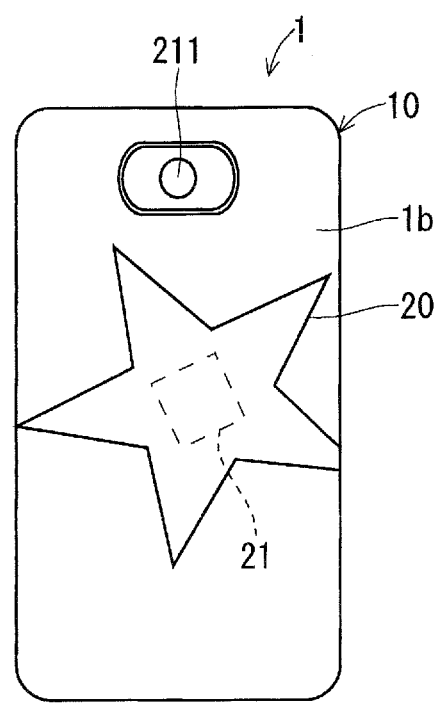
FIG. 20 illustrates a drawing showing one example of a communication device functioning as a ticket.

The communication device 2 functioning as the passport ticket may function not as the IC card but as a seal. In this case, the communication device 2 functioning as the seal is attached to the rear surface 1*b* of the electronic apparatus 1 as shown in FIG. 20, for example. If the seal having the IC chip 20 is attached to the electronic apparatus 1 as described above, the user can easily operate the electronic apparatus 1 compared to the case of holding the electronic apparatus 1 and the IC card placed on each other. The communication device 2 used as the advertising medium may function as a seal as described above. The communication device 2 used for a purpose other than the advertising medium and the ticket described hereinafter may function as a seal.

Figure 21:
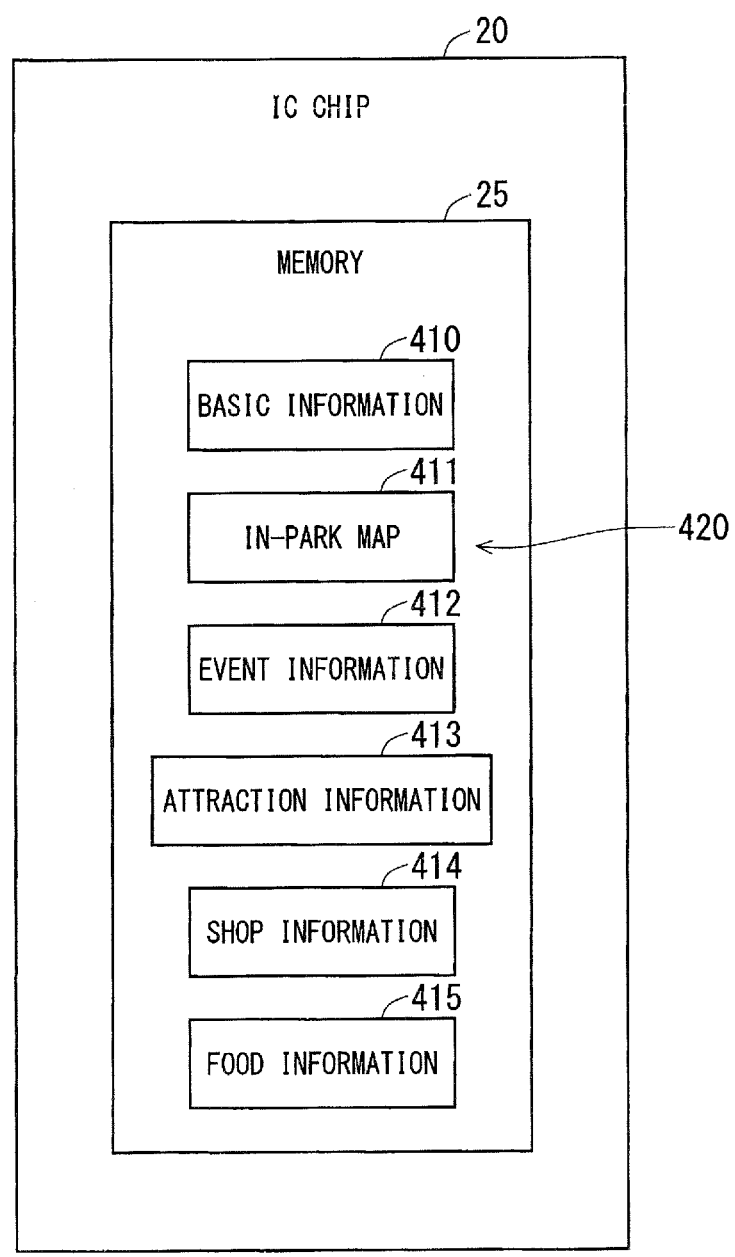
FIG. 21 illustrates a drawing showing one example of information stored in an. IC chip.

FIG. 21 is a drawing showing one example of information stored in the IC chip 20 of the communication device 2 shown in FIGS. 19 and 20. As shown in FIG. 21, the memory 25 of the IC chip 20 stores amusement park information 420 regarding an amusement park. The amusement park information 420 stores basic information 410, an in-park map 411 indicating a map in the amusement park, event information 412, attraction information 413, shop information 414, and food information 415, for example. It is also applicable that the amusement park information 420 does not include some of the basic information 410, the in-park map 411, the event information 412, the attraction information 413, the shop information 414, and the food information 415, but may include information different from these pieces of information.

The basic information 410 includes a name of the amusement park and a character image indicating a character of the amusement park, for example.

Figure 22:
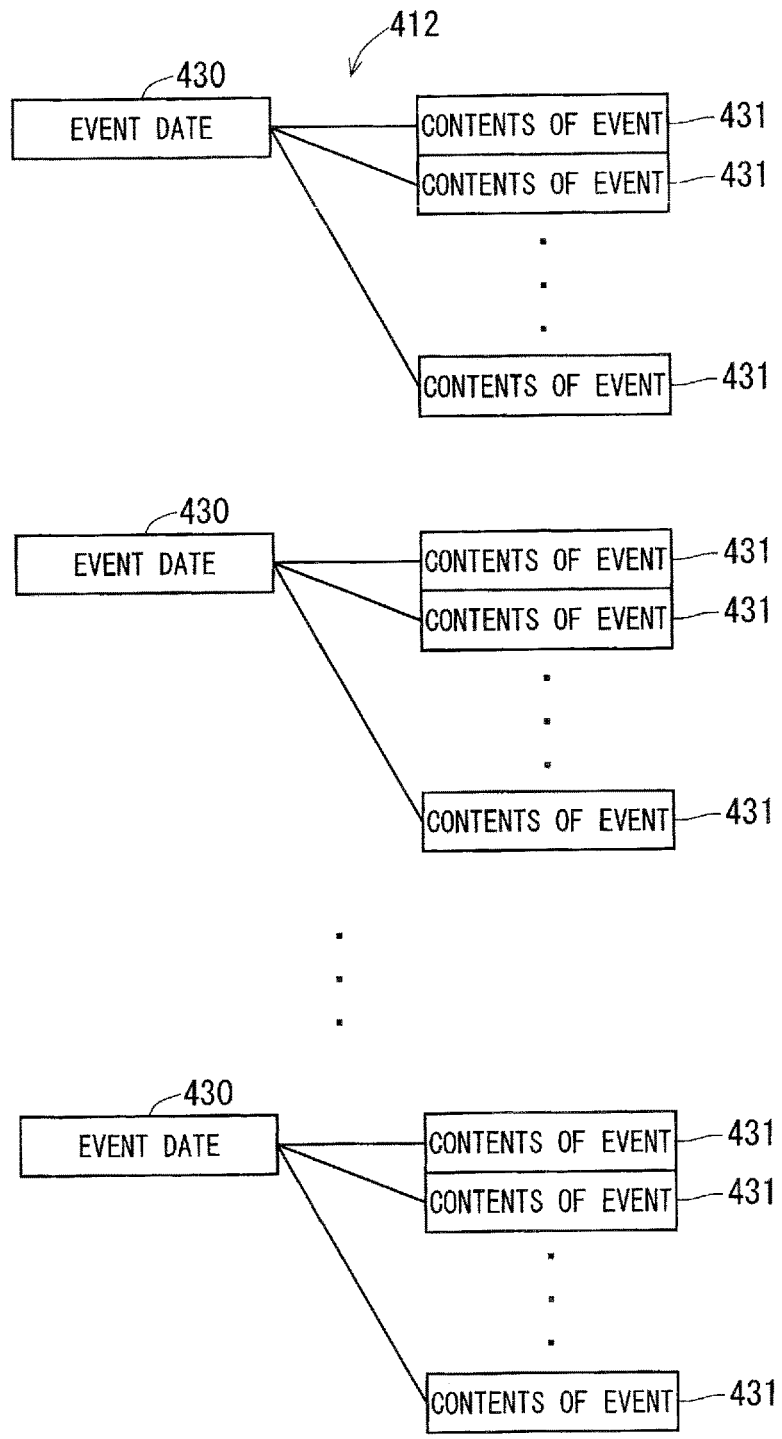
FIG. 22 illustrates a drawing showing one example of event information.

The event information 412 is information regarding an event held in the amusement park. The event information 412 comprises a plurality of event dates 430 as shown in FIG. 22. In the event information 412, a plurality of event contents 431 are associated with each event date 430. Each event content 431 indicates contents of an event held at the corresponding event date 430. The event content 431 includes an event time (start time and finish time of the event), a name of the event, and an explanation of the event, for example.

The attraction information 413 is information regarding attractions of the amusement park. The attraction information 413 includes a name, an explanation, and a position in the amusement park of each attraction of the amusement park, for example.

The shop information 414 is information regarding shops of the amusement park. The shop information 414 includes a name, an explanation, and a position in the amusement park of each shop of the amusement park, for example.

The food information 415 is information regarding restaurants of the amusement park. The food information 415 includes a name, an explanation, and a position in the amusement park of each restaurant of the amusement park, for example.

If the distance from the communication device 2 having such a configuration to the electronic apparatus 1 decreases, the controller 100 executes the subject application in the storage 103 in the electronic apparatus 1. The controller 100 performs processing of controlling the display of the display 160 in the subject application based on the obtained information which the near field wireless communication unit 120 has obtained from the IC chip 20 of the communication device 2, the current time, the current date, and the current position of the electronic apparatus 1. An operation of the controller 100 according to the present modification example is described in detail hereinafter.

Figure 23:
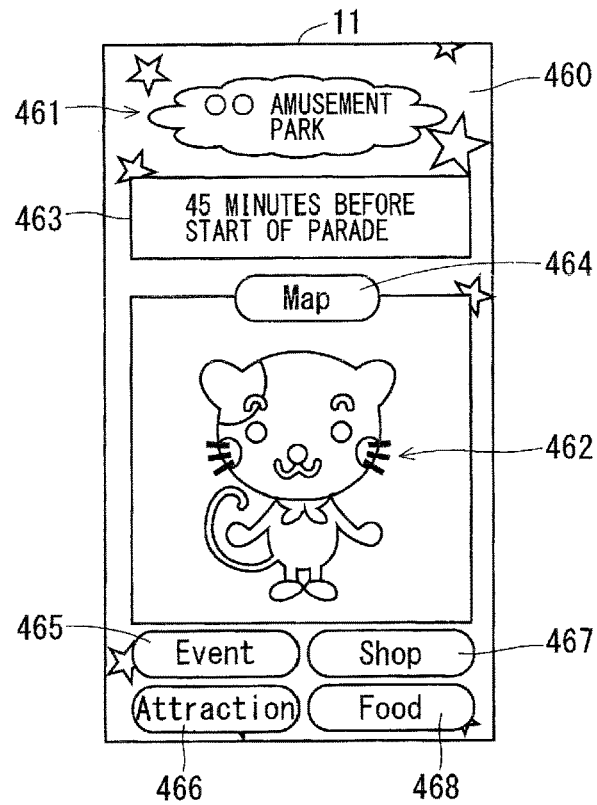
FIG. 23 illustrates a drawing showing one example of a display of the electronic apparatus.

Upon starting the execution of the subject application, the controller 100 makes the display 160 display a screen 460 shown in FIG. 23, for example, based on the obtained information. The screen 460 displayed in the display region 11 comprises a name 461 of the amusement park and a character image 462 indicating a character of the amusement park. The basic information 410 comprises the name 461 and the character image 462.

The screen 460 comprises information 463 indicating a time before a start time of a popular event for today. In the example in FIG. 23, the information 463 indicates a time from a current time to a start time of a parade held in the amusement park today. The controller 100 specifies the event date 430 coinciding with the current date in the plurality of event dates 430 included in the event information 412 obtained from the IC chip 20. Then, the controller 100 obtains each event content 431 corresponding to the event date 430 coinciding with the current date from the event information 412. The controller 100 thereby obtains the event content 431 for each event held today. Then, the controller 100 obtains the event content 431 corresponding to the targeted event in the obtained event contents 431, that is a start time of the event included in the event content 431 corresponding to the parade in the present example. The controller 100 obtains the time before the start time of the parade for today based on the obtained event start time and the current time. Then, the controller 100 makes the display 160 display the information 463 indicating the obtained time.

The screen 460 comprises a map button 464, an event button 465, an attraction button 466, a shop button 467, and a food button 468.

The map button 464 is an operation button for making the display 160 display the map in the amusement park. The event button 465 is an operation button for making the display 160 display the information regarding the event for today in the amusement park. The attraction button 466 is an operation button for making the display 160 display the information regarding the attractions in the amusement park. The shop button 467 is an operation button for making the display 160 display the information regarding the shops in the amusement park. The food button 468 is an operation button for making the display 160 display the information regarding the restaurants in the amusement park.

Figure 24:
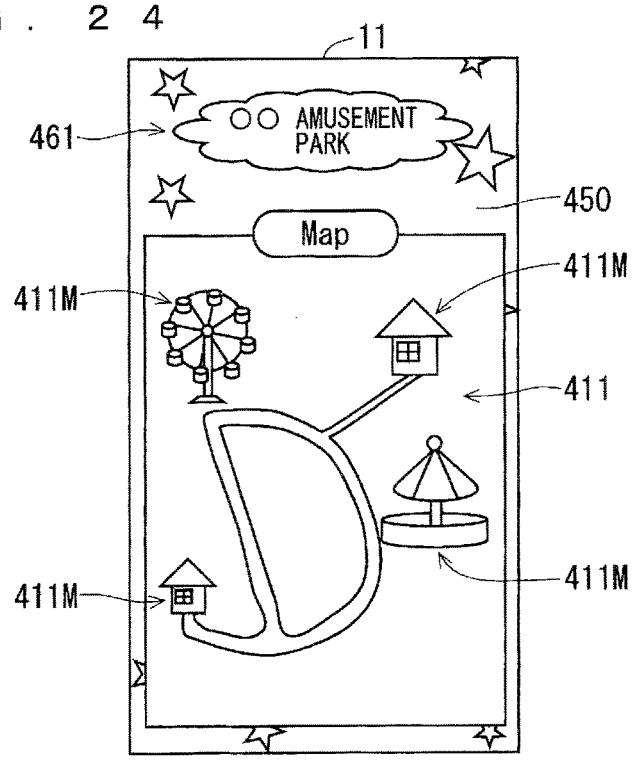
FIG. 24 illustrates a drawing showing one example of a display of the electronic apparatus.

If the user performs a predetermined operation (a tap operation, for example) on the map button 464, the controller 100 makes the display 160 display the in-park map 411 included in the obtained information obtained from the IC chip 20. Specifically, the controller 100 makes the display 160 display a map screen 450 comprising the in-park map 411 shown in FIG. 24. Marks 411M indicating positions of the attraction, the shop, and the restaurant, for example, are shown on the in-park map 411. The map screen 450 also comprises the name 461 of the amusement park.

If the user performs a predetermined operation (a tap operation, for example) on the event button 465, the controller 100 makes the display 160 display an event screen 470 based on the event information 412 included in the obtained information obtained from the IC chip 20.

If the user performs a predetermined operation (a tap operation, for example) on the attraction button 466, the controller 100 displays an attraction screen 480 based on the attraction information 413 included in the obtained information obtained from the IC chip 20.

If the user performs a predetermined operation (a tap operation, for example) on the shop button 467, the controller 100 displays a shop screen 510 based on the shop information 414 included in the obtained information obtained from the IC chip 20.

If the user performs a predetermined operation (a tap operation, for example) on the food button 468, the controller 100 displays a food screen 520 based on the food information 415 included in the obtained information obtained from the IC chip 20.

The event screen 470, the attraction screen 480, the shop screen 510, and the food screen 520 are described in detail hereinafter.

<Event Screen>

Figure 25:
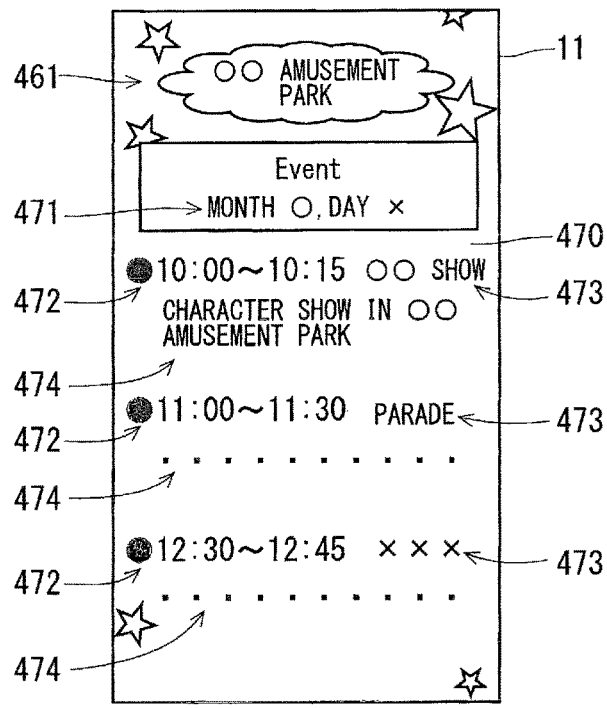
FIG. 25 illustrates a drawing showing one example of a display of the electronic apparatus.

FIG. 25 is a drawing showing one example of the event screen 470. The event screen 470 comprises the name 461 of the amusement park and a current date 471. The event screen 470 includes the information regarding the event held today. Specifically, the event screen 470 comprises an event time 472 of the event, a name 473 of the event, and an explanation 474 of the event for each event held today. The user can make the electronic apparatus 1 perform a scroll display of the event screen 470 by performing a slide operation in an up and down direction on the display region 11, for example.

The controller 100 specifies the event date 430 coinciding with the current date in the plurality of event dates 430 included in the event information 412 obtained from the IC chip 20. Then, the controller 100 obtains each event content 431 corresponding to the event date 430 coinciding with the current date from the event information 412. The controller 100 thereby obtains the event content 431 for each event held today. The controller 100 makes the display 160 display the event screen 470 based on each obtained event content 431.

<Attraction Screen>

Figure 26:
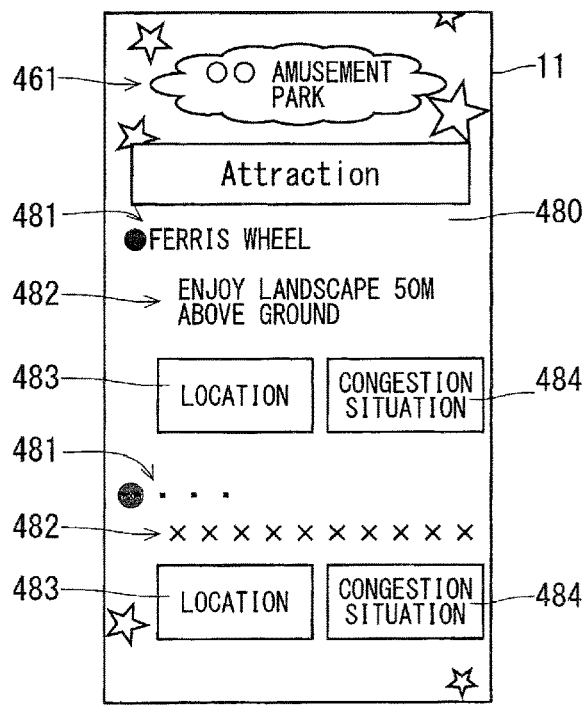
FIG. 26 illustrates a drawing showing one example of a display of the electronic apparatus.

FIG. 26 is a drawing showing one example of the attraction screen 480. The attraction screen 480 comprises the name 461 of the amusement park. The attraction screen 480 comprises, for each attraction, a name 481 of the attraction, an explanation 482 of the attraction, a location button 483 for displaying a location (position) of the attraction, and a congestion situation button 484 for displaying a congestion situation of the attraction. The attraction information 413 comprises the name 481 of the attraction and the explanation 482 of the attraction. The user can make the electronic apparatus 1 perform a scroll display of the attraction screen 480 by performing a slide operation in an up and down direction on the display region 11, for example.

Figure 27:
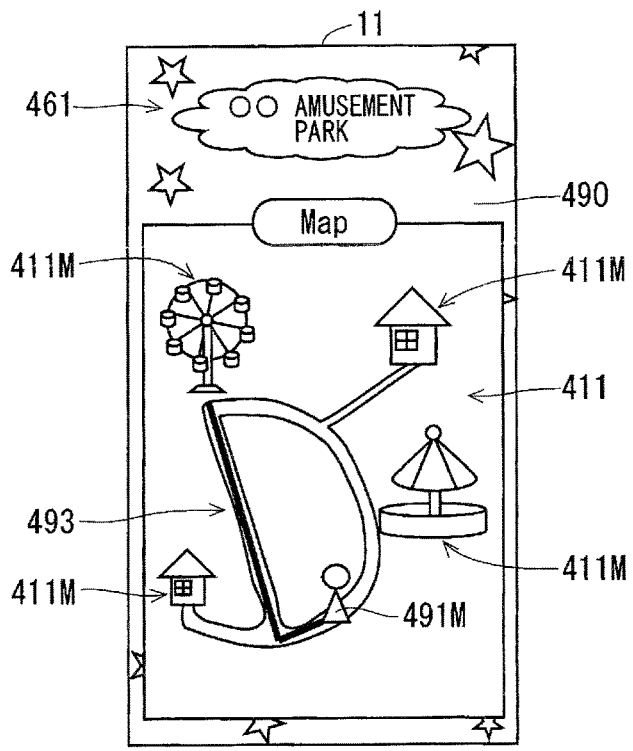
FIG. 27 illustrates a drawing showing one example of a display of the electronic apparatus.

If the user performs the tap operation, for example, on the location button 483 corresponding to a certain attraction, the controller 100 makes the display 160 display the screen 490 shown in FIG. 27. The screen 490 displayed in the display region 11 shows the in-park map 411. A mark 491M indicating a current position of the electronic apparatus 1 is shown on the in-park map 411. A route 493 from the current position of the electronic apparatus 1 to the location (position) of the targeted attraction is shown on the in-park map 411. The controller 100 obtains the route 493 on the in-park map 411 based on the position of the targeted attraction included in the attraction information 413 obtained from the IC chip 20 and the position of the electronic apparatus 1 obtained from the GPS receiver 140.

The screen 490 may comprise the information regarding the route 493 in the manner similar to FIG. 11 described above, for example. The information includes a time taken to go from the current position of the electronic apparatus 1 to the position of the targeted attraction and a distance from the current position of the electronic apparatus 1 to the position of the targeted attraction.

Figure 28:
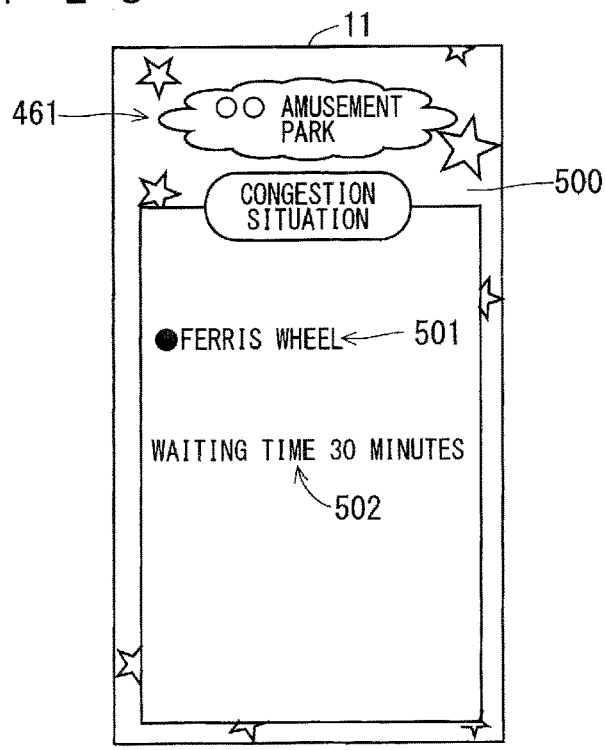
FIG. 28 illustrates a drawing showing one example of a display of the electronic apparatus.

If the user performs the tap operation, for example, on the congestion situation button 484 corresponding to a certain attraction, the controller 100 makes the display 160 display the screen 500 shown in FIG. 28. The screen 500 displayed in the display region 11 comprises a name 501 of the targeted attraction and a waiting time 502 required to use the targeted attraction. The controller 100 obtains the waiting time 502 of the targeted attraction from a server providing a waiting time of each attraction located in the amusement park, for example, via the wireless LAN communication unit 130. The controller 100 may obtain the waiting time 502 of the targeted attraction by the other means. For example, the controller 100 may obtain the waiting time 502 of the targeted attraction from a server connected to Internet to provide the waiting time of each attraction via the wireless communication unit 110.

<Shop Screen>

Figure 29:
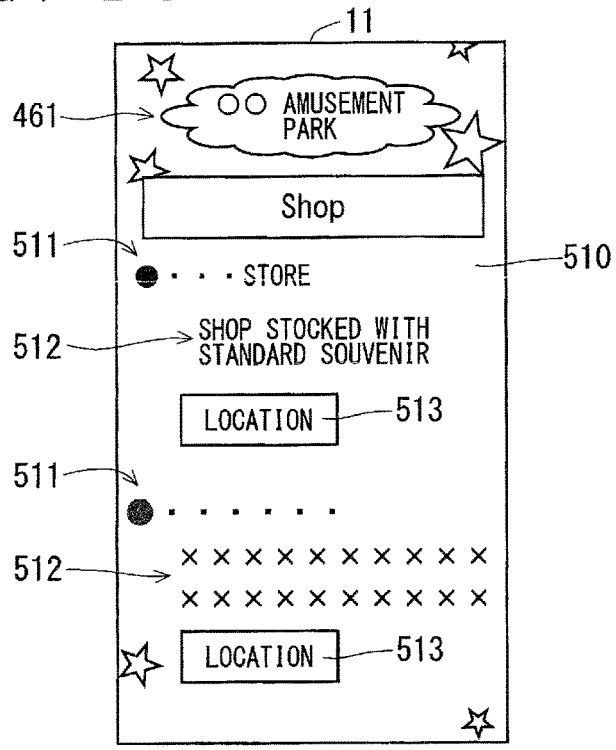
FIG. 29 illustrates a drawing showing one example of a display of the electronic apparatus.

FIG. 29 is a drawing showing one example of the shop screen 510. The shop screen 510 comprises the name 461 of the amusement park. The shop screen 510 comprises, for each shop, a name 511 of the shop, an explanation 512 of the shop, a location button 513 for displaying a location (position) of the shop. The shop information 414 comprises the name 511 of the shop and the explanation 512 of the shop. The user can make the electronic apparatus 1 perform a scroll display of the shop screen 510 by performing a slide operation in an up and down direction on the display region 11, for example.

If the user performs the tap operation, for example, on the location button 513 corresponding to a certain shop, the controller 100 makes the display 160 display the route from the current position of the electronic apparatus 1 to the location (position) of the certain shop on the in-park map 411 in the manner similar to FIG. 27 described above. The controller 100 obtains the route on the in-park map 411 based on the position of the targeted shop included in the shop information 414 obtained from the IC chip 20 and the position of the electronic apparatus 1 obtained from the GPS receiver 140.

<Food Screen>

Figure 30:
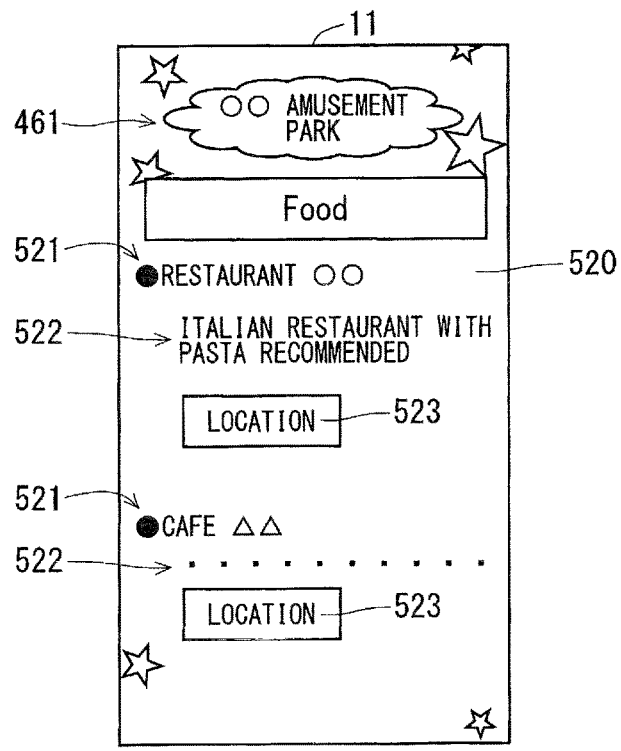
FIG. 30 illustrates a drawing showing one example of a display of the electronic apparatus.

FIG. 30 is a drawing showing one example of the food screen 520. The food screen 520 comprises the name 461 of the amusement park. The food screen 520 comprises, for each restaurant, a name 521 of the restaurant, an explanation 522 of the restaurant, and a location button 523 for displaying a location (position) of the restaurant. The food information 415 comprises the name 521 of the restaurant and the explanation 522 of the restaurant. The user can make the electronic apparatus 1 perform a scroll display of the food screen 520 by performing a slide operation in an up and down direction on the display region 21, for example.

If the user performs the tap operation, for example, on the location button 523 corresponding to a certain restaurant, the controller 100 makes the display 160 display the route from the current position of the electronic apparatus 1 to the location (position) of the certain restaurant on the in-park map 411 in the manner similar to FIG. 27 described above. The controller 100 obtains the route on the in-park map 411 based on the position of the targeted restaurant included in the food information 415 obtained from the IC chip 20 and the position of the electronic apparatus 1 obtained from the GPS receiver 140.

If the controller 100 determines that the near field wireless communication unit 120 cannot communicate with the IC chip 20 due to an increase in the distance from the electronic apparatus 1 to the communication device 2, for example, the controller 100 discards the obtained information obtained from the IC chip 20, that is to say, the in-park map 411, the event information 412, the attraction information 413, the shop information 414, and the food information 415. Furthermore, the controller 100 discards all of the information generated based on the obtained information. Specifically, the controller 100 discards the information 463, the map button 464, the event button 465, the attraction button 466, the shop button 467, and the food button 468 included in the screen 460. The controller 100 discards the mark 491M and the route 493 included in the screen 490, for example. Upon discarding the obtained information and the information generated based on the obtained information, the controller 100 finishes the subject application. When the subject application is finished, a standby screen, for example, is displayed in the display region 11. In the state where the near field wireless communication unit 120 cannot communicate with the IC chip 20, the electronic apparatus 1 does not display the screen 460, for example. Upon determining that the near field wireless communication unit 120 cannot communicate with the IC chip 20, the controller 100 may also discard the congestion situation of the attraction obtained via the wireless LAN communication unit 130.

As described above, in the present invention, if the distance to the IC chip 20 decreases, the electronic apparatus 1 can obtain the amusement park information 420 in the IC chip 20. Accordingly, the user can obtain the various types of information regarding the amusement park from the electronic apparatus 1 in the amusement park by holding the electronic apparatus 1 and the communication device 2 close to each other in the amusement park, for example. If the communication device 2 functions as the seal as shown in FIG. 20 described above, the user can obtain the various types of information regarding the amusement park from the electronic apparatus 1 in the amusement park by holding the electronic apparatus 1 to which the communication device 2 is attached in the amusement park.

If the distance to the IC chip 20 increases, the electronic apparatus 1 discards the obtained amusement park information 420, for example. Accordingly, the user can make the electronic apparatus 1 delete the amusement park information 420, for example, which is no longer necessary by separating the electronic apparatus 1 and the communication device 2 from each other after the user moves outside the amusement park. If the communication device 2 functions as the seal, the user can make the electronic apparatus 1 delete the amusement park information 420, for example, which is no longer necessary by taking the communication device 2 off the electronic apparatus 1 after the user moves outside the amusement park.

If the shop button 467 is operated, the controller 100 may display, on the shop screen 510, only the name 511, the explanation 512, and the location button 513 of the shop closest to the current position of the electronic apparatus 1 in the plurality of shops in the amusement park. If the food button 468 is operated, the controller 100 may display, on the food screen 520, only the name 521, the explanation 522, and the location button 523 of the restaurant closest to the current position of the electronic apparatus 1 in the plurality of restaurants in the amusement park.

It is also applicable that the controller 100 does not include the information of all of the events to be held today in the event screen 470 but includes only the information of the event starting after the current time in the events to be held today. In this case, the controller 100 sets the event content 431 corresponding to the current date and the current time to the information to be used in the plurality of event contents 431 included in the obtained information.

<Usage of Communication Device as Electronic Book>

Figure 31:
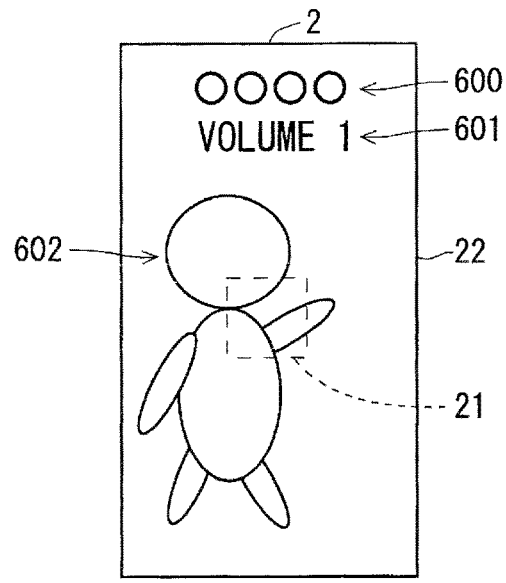
FIG. 31 illustrates a drawing showing one example of a communication device functioning as an electronic book.

In the present example, the communication device 2 is used as an electronic book. FIG. 31 is a drawing showing one example of the communication device 2 used as the electronic book. In the example in FIG. 31, the communication device 2 functions as an electronic comic book. The user rents the communication device 2 functioning as the electronic comic book from a rental shop, for example. That is to say, the communication device 2 functions as a rental electronic book. A title 600 of a comic, a volume number 601 of the comic, and a character 602 of the comic, for example, are printed on the surface of the case 22 of the communication device 2. In the present example, the communication device 2 is also referred to as the "rental electronic book 2" in some cases. The rental electronic book 2 has a card shape. The communication device 2 may function as an electronic book other than the comic. The communication device 2 may function as an electronic book bought by the user.

Figure 32:
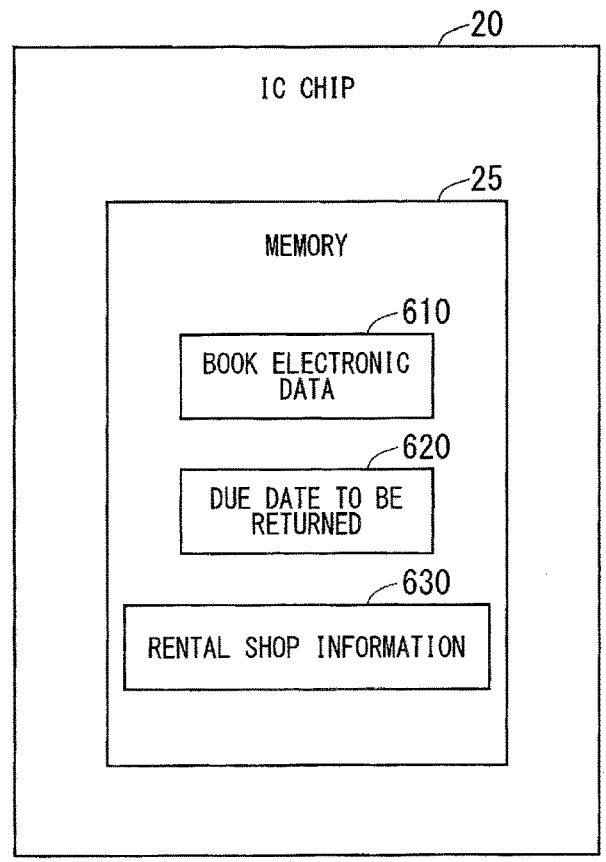
FIG. 32 illustrates a drawing showing one example of information stored in an IC chip.

FIG. 32 is a drawing showing one example of information stored in the IC chip 20 of the rental electronic book 2. As shown in FIG. 32, the memory 25 of the IC chip 20 stores an electronic data of a book (book electronic data) 610 and a due date to be returned 620 and rental shop information 630 of the rental electronic book 2, for example. The book electronic data 610 includes image data indicating contents of the book, that is image data indicating contents of the comic in the present example. The due date to be returned 620 is expressed by "month" and "day", for example. The rental shop information 630 includes information regarding a plurality of rental shops to which the user can return the rental electronic book 2. The rental shop information 630 includes a name and a position of each rental shop, for example.

If the distance from the rental electronic book 2 to the electronic apparatus 1 decreases, the controller 100 executes the subject application in the storage 103 in the electronic apparatus 1. The controller 100 performs processing of controlling the display of the display 160 in the subject application based on the obtained information which the near field wireless communication unit 120 has obtained from the IC chip 20 of the communication device 2, the current time, the current date, and the current position of the electronic apparatus 1. An operation of the controller 100 according to the present modification example is described in detail hereinafter.

Figure 33:
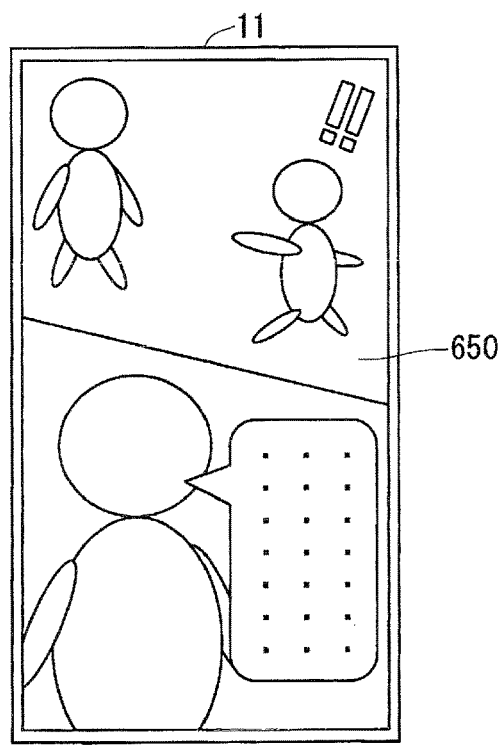
FIG. 33 illustrates a drawing showing one example of a display of the electronic apparatus.

Upon starting the execution of the subject application, the controller 100 makes the display 160 display a content 650 of the book (comic) based on the book electronic data 610 obtained from the IC chip 20. FIG. 33 is a drawing showing one example of the display of the content 650 of the book in the display, region 11. The user can make the electronic apparatus 1 change a page displayed in the display region 11 by performing a flick operation in an up and down direction on the display region 11, for example.

Figure 34:
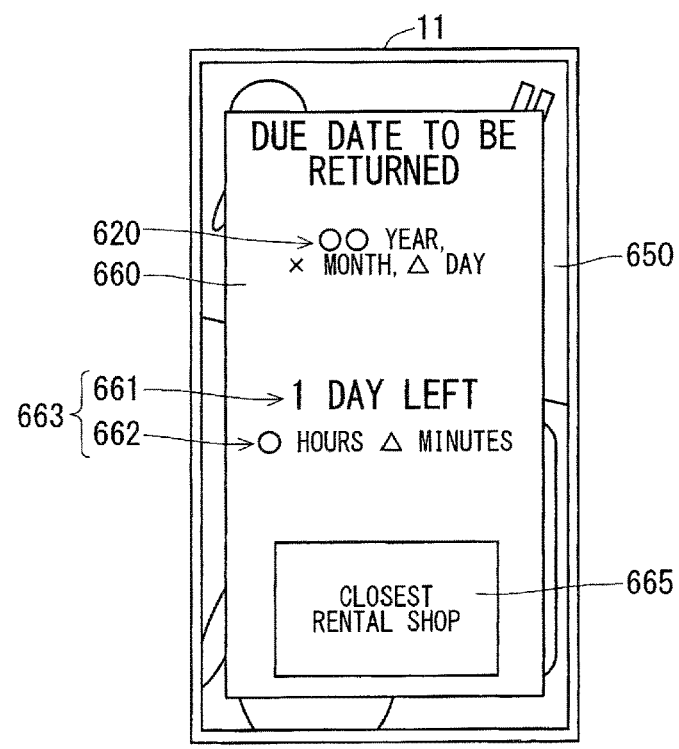
FIG. 34 illustrates a drawing showing one example of a display of the electronic apparatus.

The controller 100 gives caution to the user when the due date of the rental electronic book 2 approaches. Specifically, the controller 100 regularly compares the due date to be returned 620 obtained from the IC chip 20 and the current date, and if a total number of days from the current date to the due date to be returned 620 is equal to or smaller than a predetermined value, the controller 100 makes the display 160 display a caution screen 660 shown in FIG. 34 to be placed on the book 650, for example.

The caution screen 660 comprises the due date to be returned 620 and information 663 indicating a remaining time before the due date to be returned 620. The information 663 comprises information 661 expressing the remaining time before the due date to be returned 620 by the number of days and the information 662 expressing the remaining time before the due date to be returned 620 by "hour" and "minute". The controller 100 obtains the number of days from the current date to the due date to be returned 620 to make the display 160 display the obtained number of days as the information 661. The controller 100 makes the display 160 display the information expressing the time from the current date and time to 12 a.m. of the due date to be returned 620 by "hour" and "minute" as the information 662, for example.

The caution screen 660 comprises a closest shop button 665 for displaying the position of the rental shop closest to the current position of the electronic apparatus 1. If the user performs a tap operation, for example, on the closest shop button 665, the controller 100 makes the display 160 display a route from the current position of the electronic apparatus 1 to the position of the rental shop closest to the current position on the map in the manner similar to FIG. 11 described above, for example. The controller 100 obtains the position of the rental shop closest to the current position of the electronic apparatus 1 from the rental shop information 630 obtained from the IC chip 20. Then, the controller 100 obtains a route from the current position of the electronic apparatus 1 to the obtained position of the rental shop.

If the controller 100 determines that the near field wireless communication unit 120 cannot communicate with the IC chip 20 due to an increase in the distance from the electronic apparatus 1 to the rental electronic book 2, for example, the controller 100 discards the obtained information obtained from the IC chip 20, that is to say, the book electronic data 610, the due date to be returned 620, and the rental shop information 630. Furthermore, the controller 100 discards all of the information generated based on the obtained information. Specifically, the controller 100 discards the information 663 included in the caution screen 660, for example. Upon discarding the obtained information and the information generated based on the obtained information, the controller 100 finishes the subject application. When the subject application is finished, a standby screen, for example, is displayed in the display region 11. In the state where the near field wireless communication unit 120 cannot communicate with the IC chip 20, the electronic apparatus 1 does not display the book 650 and the caution screen 620.

As described above, in the present invention, if the distance to the IC chip 20 decreases, the electronic apparatus 1 can obtain the book electronic data 610 in the IC chip 20. Accordingly, the user can view contents of the book displayed by the rental electronic book 2 with the electronic apparatus 1 and the rental electronic book 2 placed on each other in one hand, for example.

The electronic apparatus 1 obtains the due date to be returned 620 of the rental electronic book 2 from the IC chip 20, and gives caution to the user when the current date approaches the due date to be returned 620. Accordingly, the user can easily recognize that the due date to be returned 620 of the rental electronic book 2 approaches. It is also applicable that the information indicating the remaining time before the due date to be returned 620 included in the caution screen 660 is displayed not only when the current date approaches the due date to be returned 620 but also when the current date does not approach the due date to be returned 620. In this case, the information 663 may be displayed in a small size to be placed on the book 650 displayed on the display 160 as shown in FIG. 33, for example.

Since the electronic apparatus 1 discards the obtained information such as the book electronic data 610 obtained from the IC chip 20 when the distance to the IC chip 20 increases, no obtained information remains in the electronic apparatus 1 after the user returns the rental electronic book 2 to the rental shop. Thus, the user cannot view the contents of the book using the electronic apparatus 1 after the user returns the rental electronic book 2 to the rental shop, and the rental shop can thereby appropriately perform a rental operation.

In the meanwhile, considered as a rental method of the electronic book is that the electronic apparatus 1 communicates with a web server, which distributes the book electronic data, using the wireless communication unit 110 so that the contents of the book can be displayed for a predetermined period of time based on the book electronic data obtained from the web server. In this case, there is a possibility that the communication between the electronic apparatus 1 and the web server puts the user to expense. Such a communication is unnecessary in the present example, thus the communication expense can be reduced.

Figure 35:
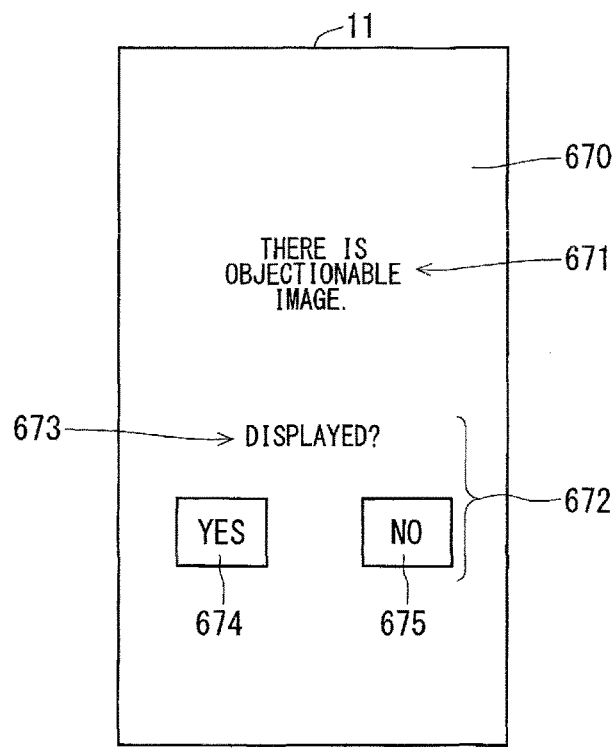
FIG. 35 illustrates a drawing showing one example of a display of the electronic apparatus.

In the electronic apparatus 1, the controller 100 may give caution to the user if the contents of the book indicated by the book electronic data 610 obtained from the IC chip data 20 include an objectionable image. For example, if the contents of the book indicated by the book electronic data 610 include the objectionable image, the controller 100 makes the display 160 display a caution screen 670 shown in FIG. 35 before making the display 160 display the contents of the book based on the book electronic data 610.

The caution screen 670 comprises notification information 671 notifying the user that the contents of the book include the objectionable image. The caution screen 670 comprises an image 672 for confirming with the user about whether or not the electronic apparatus 1 displays the contents of the book. The image 672 comprises a character string 673 of "displayed?" The image 672 comprises a YES button 674 used when the user instructs the electronic apparatus 1 to display the contents of the book and a NO button 675 used when the user instructs the electronic apparatus 1 not to display the contents of the book.

If the user performs a tap operation, for example, on the YES button 674, the controller 100 makes the display 160 display the contents of the book in the manner similar to FIG. 33 described above. In the meanwhile, if the user performs a tap operation, for example, on the NO button 675, the controller 100 does not make the display 160 display the contents of the book. Accordingly, the user cannot view the contents of the book using the electronic apparatus 1 in this case.

Upon starting the execution of the subject application, the controller 100 determines whether or not the contents of the book include the objectionable image before making the display 160 display the contents of the book. For example, the controller 100 performs an image processing on the image data of the book included in the book electronic data 610 to determine whether or not the contents of the book include an objectionable character string which is previously stored in the storage 103. If the contents of the book include the objectionable character string, the controller 100 determines that the contents of the book include the objectionable image. In the meanwhile, if the contents of the book do not include the objectionable character string, the controller 100 determines that the contents of the book do not include the objectionable image. If the controller 100 determines that the contents of the book include the objectionable image, the controller 100 makes the display 160 display the caution screen 670. In the meanwhile, if the controller 100 determines that the contents of the book do not include the objectionable image, the controller 100 makes the display 160 display the contents of the book.

Figure 36:
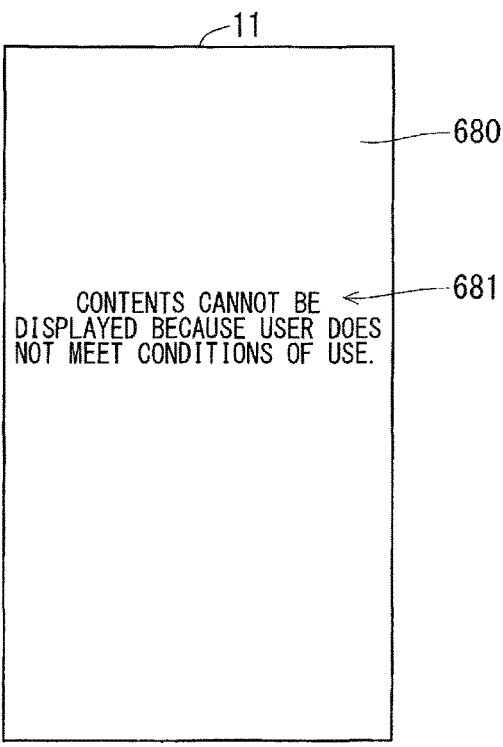
FIG. 36 illustrates a drawing showing one example of a display of the electronic apparatus.

If the IC chip 20 stores conditions of use of the rental electronic book 2 for the user, upon starting the execution of the subject application, the controller 100 may determine whether or not the user of the electronic apparatus 1 meets the conditions of use based on the user information in the storage 103 before making the display 160 display the contents of the book. Upon determining that the user meets the conditions of use, the controller 100 makes the display 160 display the contents of the book. In the meanwhile, upon determining that the user does not meet the conditions of use, the controller 100 notifies the user of it. At this time, the controller 100 makes the display 160 display a notification screen 680 for notifying that the user does not meet the conditions of use, for example. FIG. 36 is a drawing showing one example of the notification screen 680. The notification screen 680 includes notification information 681 for notifying that the electronic apparatus 1 does not display the contents of the book by reason that the user does not meet the conditions of use. If the electronic apparatus 1 displays the notification screen 680, the electronic apparatus 1 does not display the contents of the book.

The conditions of use include an age limit for using the electronic book, for example. In this case, the controller 100 compares an age of the user included in the user information in the storage 103 and the age limit included in the obtained information obtained from the IC chip 20. If the age of the user meets the age limit, the controller 100 determines that the user meets the conditions of use. In the meanwhile, if the age of the user does not meet the age limit, the controller 100 determines that the user does not meet the conditions of use.

Although the communication device 2 functions as the rental electronic book in the example described above, the communication device 2 may functions as a rental video or a rental CD. In this case, the IC chip 20 of the communication device 2 stores video data or music data instead of the book electronic data 610. If the communication device 2 functions as the rental video, the electronic apparatus 1 reproduces the video data obtained from the IC chip 20 using the display 160 and the speaker 180, for example, in the subject application. When the current date approaches a due date to be returned of the rental video, the electronic apparatus 1 makes the display 160 display a caution screen similar to the caution screen 660 shown in FIG. 34. If the communication device 2 functions as the rental CD, the electronic apparatus 1 reproduces the music data obtained from the IC chip 20 using the speaker 180, for example, in the subject application. When the current date approaches a due date to be returned of the rental CD, the electronic apparatus 1 makes the display 160 display a caution screen similar to the caution screen 660.

The user of the electronic apparatus 1 may preview the music data for a predetermined period of time for free using the communication device 2. In this case, the IC chip 20 of the communication device 2 includes the music data and a preview-free period. The controller 100 determines whether or not the preview-free period obtained from the IC chip 20 includes the current date in the subject application. If the preview-free period includes the current date, the controller 100 reproduces the music data obtained from the IC chip 20 and outputs the music from the speaker 180, for example. In the meanwhile, if the preview-free period does not include the current date, the controller 100 does not reproduce the music data obtained from the IC chip 20. In reproducing the music data, if the current date approaches an end of the preview-free period, the controller 100 may make the display 160 display the time before the end of the preview-free period in a manner similar to the information 663 shown in FIG. 34 described above.

<Usage of Communication Device as Name Card>

In the present example, the communication device 2 is used as a name card. FIG. 37 is a drawing showing one example of the communication device 2 used as the name card. Brief information regarding a targeted person is printed on the surface of the case 22 of the communication device 2 functioning as the name card. A name 702 of the targeted person, a company name 700 of a company in which the targeted person works, and a division name 701 of a division to which the targeted person belongs are printed on the case 22 of the communication device 2. The IC chip 20 of the communication device 2 stores detailed information of the targeted person. In other words, the IC chip 20 stores more information of the targeted person than that shown on the case 22.

The IC chip 20 stores not only the name 702, the company name 700, and the division name 701 but also an address and a URL of a homepage of the company of the targeted person, for example. The IC chip 20 stores a phone number of the company of the targeted person and a phone number of a mobile phone of the targeted person. The IC chip 20 stores an e-mail address in the company of the targeted person and an e-mail address of a mobile phone of the targeted person.

If the distance from the communication device 1 to the electronic apparatus 2 decreases, the controller 100 executes the subject application in the storage 103 in the electronic apparatus 1. The controller 100 makes the display 160 display a screen 710 including the obtained information which the near field wireless communication unit 120 has obtained from the IC chip 20 of the communication device 2 in the subject application.

FIG. 38 is a drawing showing one example of the screen 710. The screen 710 comprises the name 702, the company name 700, and the division name 701, for example. The screen 710 comprises an address 711 and an URL 716 of a homepage of the company of the targeted person. The screen 710 comprises a phone number 712 of the company of the targeted person, a phone number 713 of a mobile phone of the targeted person, an e-mail address 714 in the company of the targeted person, and an e-mail address 715 of a mobile phone of the targeted person. If the IC chip 20 includes a profile of the targeted person, the screen 710 may include the profile.

If the controller 100 determines that the near field wireless communication unit 120 cannot communicate with the IC chip 20 due to an increase in the distance from the electronic apparatus 1 to the communication device 2, for example, the controller 100 discards the obtained information obtained from the IC chip 20. Upon discarding the obtained information, the controller 100 finishes the subject application. When the subject application is finished, a standby screen, for example, is displayed in the display region 11. In the state where the near field wireless communication unit 120 cannot communicate with the IC chip 20, the electronic apparatus 1 does not display the screen 710.

As described above, in the present example, the IC chip 20 of the communication device 2 stores the detailed information regarding the targeted person, thus the user of the electronic apparatus 1 can confirm the detailed information regarding the targeted person, using the electronic apparatus 1, by moving the electronic apparatus 1 and the communication device 2 close to each other.

In the present example, only the brief information regarding the targeted person is shown on the surface of the case 22 of the communication device 2, thus it can be suppressed that the detailed information of the targeted person is known by a person other than a person intended to be notified of the information regarding the targeted person.

If a tap operation is performed on the URL 716 included in the screen 710, the controller 100 may execute a browser in the storage 103 to make the display 160 display the homepage of the company of the targeted person.

If a tap operation is performed on the address 711 included in the screen 710, the controller 100 may make the display 160 display a route from the current position of the electronic apparatus 1 to the address 711 of the company of the targeted person on the map in the manner similar to FIG. 11 described above.

>Various Modification Examples

The various modification examples of the electronic apparatus 1 are described below.

>First Modification Examples

If the user operates the display region 11 to instruct the electronic apparatus 1 to finish the subject application in the state where the subject application is executed, the controller 100 may finish the subject application and discard the obtained information obtained from the IC chip 20 even in a case where the near field wireless communication unit 120 can communicate with the IC chip 20. In this case, the controller 100 may also discard the information generated based on the obtained information.

The controller 100 discards the obtained information obtained from the IC chip 20 when finishing the subject application even in the case where the near field wireless communication unit 120 can communicate with the IC chip 20, thus the user can make the electronic apparatus 1 discard the obtained information without increasing the distance from the electronic apparatus 1 to the communication device 2. Thus, operability of the electronic apparatus 1 is improved.

The controller 100 may execute Step s1 described above after finishing the subject application and discarding the obtained information obtained from the IC chip 20. If the user increases the distance from the electronic apparatus 1 to the communication device 2 immediately after instructing the electronic apparatus 1 to finish the subject application, the determination is No in Step s1. Accordingly, the user increases the distance from the electronic apparatus 1 to the communication device 2 immediately after instructing the electronic apparatus 1 to finish the subject application, thus an automatic activation of the subject application in the electronic apparatus 1 can be suppressed after instructing the electronic apparatus 1 to finish the subject application.

>Second Modification Examples

It is also applicable that the controller 100 does not discard the information designated by the user in the obtained information obtained from the IC chip 20. In this case, a non-volatile memory included in the storage 103, for example, stores the information designated by the user. The user can designate the information which the electronic apparatus 1 does not discard (in other words, the information stored by the electronic apparatus 1) in the obtained information by operating the display region 11, for example.

It is also applicable that the controller 100 does not discard the information designated by the user in the information generated based on the obtained information. In this case, a non-volatile memory included in the storage 103, for example, stores the information designated by the user. The user can designate the information which the electronic apparatus 1 does not discard in the information generated based on the obtained information by operating the display region 11, for example.

An operation of the electronic apparatus 1 according to the present modification example is described hereinafter with an example of a case where the communication device 2 functions as the advertising medium, the ticket, and the name card.

<Usage of Communication Device as Advertising Medium>

Considered is a case where the communication device 2 functions as the advertising medium as shown in FIG. 8. In this case, if the user performs a predetermined operation on the screen 350 displayed in the display region 11 (refer to FIG. 11) to designate the map 353, the marks 310M and 355M, the route 354, and the information 357, for example, as the information not to be discarded, the controller 100 stores these pieces of information in the non-volatile memory of the storage 103. The controller 100 does not delete the map 353, the marks 310M and 355M, the route 354, and the information 357 from the storage 103 even if the near field wireless communication unit 120 becomes unable to communicate with the IC chip 20. Thus, the electronic apparatus 1 can use the information stored in the non-volatile memory regardless of whether or not the near field wireless communication unit 120 can communicate with the IC chip 20. For example, the controller 100 can make the display 160 display the map 353, the marks 310M and 355M, the route 354, and the information 357 stored in the non-volatile memory in accordance with the instruction from the user to perform the display in the manner similar to FIG. 11.

If the user performs a predetermined operation on the screen 360 displayed in the display region 11 (refer to FIG. 12) to designate the sale item information 332 shown in the screen 360 as the information not to be discarded, the controller 100 stores the sale item information 332 in the non-volatile memory of the storage 103. The controller 100 does not delete the sale item information 332 from the storage 103 even if the near field wireless communication unit 120 becomes unable to communicate with the IC chip 20. The controller 100 makes the display 160 display the sale item information in the non-volatile memory in accordance with the instruction from the user to perform the display, for example.

<Usage of Communication Device as Ticket>

Considered is a case where the communication device 2 functions as the ticket as shown in FIG. 19. In this case, if the user performs a predetermined operation on the map screen 450 displayed in the display region 11 (refer to FIG. 24) to designate the in-park map 411 as the information not to be discarded, the controller 100 stores the in-park map 411 in the non-volatile memory of the storage 103. The controller 100 does not delete the in-park map 411 from the storage 103 even if the near field wireless communication unit 120 becomes unable to communicate with the IC chip 20. The controller 100 makes the display 160 display the in-park map 411 in the non-volatile memory in accordance with the instruction from the user to perform the display, for example.

If the user performs a predetermined operation on the screen 490 displayed in the display region 11 (refer to FIG. 27) to designate the in-park map 411, the mark 491M, and the route 493 shown in the screen 490 as the information not to be discarded, the controller 100 stores these pieces of information in the non-volatile memory. The controller 100 does not delete the in-park map 411, the mark 491M, and the route 493 from the storage 103 even if the near field wireless communication unit 120 becomes unable to communicate with the IC chip 20. The controller 100 makes the display 160 display the in-park map 411, the mark 491M, and the route 493 in the non-volatile memory in accordance with the instruction from the user to perform the display, for example, in the manner similar to FIG. 27.

<Usage of Communication Device as Name Card>

Considered is a case where the communication device 2 functions as the name card as shown in FIG. 37. In this case, if the user performs a predetermined operation on the screen 710 displayed in the display region 11 (refer to FIG. 38) to designate the company name 700, the division name 701, the name 702, the phone number 712 of the company, and the e-mail address 714 in the company shown in the screen 710 as the information not to be discarded, the controller 100 stores these pieces of information in the non-volatile memory in the storage 103. For example, the controller 100 registers these pieces of information in an address book in the non-volatile memory. Thus, the electronic apparatus 1 registers these pieces of information even if the user does not input the company name 700 and so on to the electronic apparatus 1. The controller 100 does not delete the company name 700, the division name 701, the name 702, the phone number 712, and the e-mail address 714 from the storage 103 even if the near field wireless communication unit 120 becomes unable to communicate with the IC chip 20. The controller 100 makes the display 160 display the company name 700, the division name 701, the name 702, the phone number 712, and the e-mail address 714 when making the display 160 display the address book in the non-volatile memory, for example.

As described above, in the present modification example, the controller 100 does not discard the information designated by the user in the obtained information, thus the electronic apparatus 1 can use the information designated by the user regardless of whether or not the near field wireless communication unit 120 can communicate with the IC chip 20.

The controller 100 does not discard the information designated by the user in the information generated based on the obtained information, thus the electronic apparatus 1 can use the information designated by the user regardless of whether or not the near field wireless communication unit 120 can communicate with the IC chip 20.

Some of the plurality pieces of information in the IC chip 20 may be storage prohibited information which cannot be stored in the non-volatile memory of the storage 103 in the electronic apparatus 1. If storage information stored in the IC chip 20 is the storage prohibited information, the storage information shows the state thereof. If designated information designated by the user in the obtained information obtained from the IC chip 20 is the storage prohibited information, the controller 100 does not store the designated information in the non-volatile memory in the storage 103. In this case, the controller 100 discards the storage prohibited information in the storage 103 when the near field wireless communication unit 120 becomes unable to communicate with the IC chip 20. In the meanwhile, if the designated information designated by the user in the obtained information obtained from the IC chip 20 is not the storage prohibited information, the controller 100 stores the designated information in the non-volatile memory in the storage 103.

><Other Modification Examples≤

Although the electronic apparatus 1 is a mobile phone, such as a smartphone, in the above-mentioned examples, the electronic apparatus 1 may be the other types of electronic apparatuses. The electronic apparatus 1 may be a tablet terminal, a personal computer, and a wearable apparatus, for example.

While the electronic apparatus 1 and the communication device 2 have been described above in detail, the above description is in all aspects illustrative and not restrictive. The various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:
   a communication unit configured to communicate with an IC chip to obtain information in the IC chip; and
   at least one processor configured to perform processing based on obtained information being obtained by the communication unit, wherein
   the at least one processor discards the obtained information when the communication unit becomes unable to communicate with the IC chip, and wherein
   the at least one processor performs the processing based on at least one of a current time, a current date, a current position of the electronic apparatus, and user information regarding a user and the obtained information.

2. The electronic apparatus according to claim 1, wherein the at least one processor discards the obtained information and information generated based on the obtained information in the processing when the communication unit becomes unable to communicate with the IC chip.

3. The electronic apparatus according to claim 1, wherein the processing comprises causing a display to display a route from the current position or a position included in the user information to a position included in the obtained information.

4. The electronic apparatus according to claim 1, wherein the processing comprises causing a display to display a time from the current time to a time included in the obtained information or a time from the current date to a date included in the obtained information.

5. The electronic apparatus according to claim 1, wherein the at least one processor selects information to be used in the processing from the obtained information based on predetermined information.

6. The electronic apparatus according to claim 5, wherein the at least one processor selects the information to be used from the obtained information based on at least one of the current time, the current date, the current position of the electronic apparatus, and the user information regarding the user.

7. The electronic apparatus according to claim 1, wherein the at least one processor stores designated information designated by a user in the obtained information, and the at least one processor does not discard the designated information even if the communication unit becomes unable to communicate with the IC chip.

8. The electronic apparatus according to claim 1, wherein the at least one processor performs the processing based on the obtained information in a predetermined application, and
   the at least one processor discards the obtained information when finishing the predetermined application even if the communication unit can communicate with the IC chip.

9. The electronic apparatus according to claim 1, wherein a seal comprising the IC chip is attached to the electronic apparatus.

10. A control device being included in an electronic apparatus communicating with an IC chip for controlling an operation of the electronic apparatus, wherein
    the control device performs processing based on obtained information which the electronic apparatus obtains from the IC chip, and discards the obtained information when the electronic apparatus becomes unable to communicate with the IC chip, and wherein
    the control device performs the processing based on at least one of a current time, a current date, a current position of the electronic apparatus, and user information regarding a user and the obtained information.

11. An operating method of an electronic apparatus, comprising:
    (a) communicating with an IC chip to obtain information stored in the IC chip;
    (b) performing processing based on the obtained information; and
    (c) discarding the obtained information when a communication with the IC chip becomes unable to be performed, wherein
    the at least one processor selects information to be used in the processing from the obtained information based on predetermined information, and wherein
    the at least one processor selects the information to be used from the obtained information based on at least one of a current time, a current date, a current position of the electronic apparatus, and a user information regarding a user.

12. The electronic apparatus according to claim 11, wherein
    the user information includes at least one of an address, an age, and a sex of the user, and
    the at least one processor selects the information to be used from the obtained information based on the user information.

13. The electronic apparatus according to claim 12, wherein
    the at least one processor sets a first position closest to a second position included in the user information in a plurality of first positions included in the obtained information to the information to be used.

14. The electronic apparatus according to claim 11, wherein
    the at least one processor sets a first position closest to a second position which is the current position in a plurality of first positions included in the obtained information to the information to be used.

15. The electronic apparatus according to claim 14, wherein
    the at least one processor causes a display to display the first position closest to the second position in the processing.

16. The electronic apparatus according to claim 15, wherein
    the at least one processor causes the display to display a route from the second position to the first position closest to the second position in the processing.

17. The electronic apparatus according to claim 11, wherein
    the at least one processor sets information corresponding to at least one of the current time and the current date in a plurality of pieces of information included in the obtained information to the information to be used.

18. The electronic apparatus according to claim 17, wherein
the at least one processor causes a display to display the information corresponding to at least one of the current time and the current date in the processing.

* * * * *